(12) United States Patent
Capelo et al.

(10) Patent No.: US 11,379,140 B2
(45) Date of Patent: Jul. 5, 2022

(54) SYSTEM AND METHOD FOR MODEL TRAINING ORCHESTRATION

(71) Applicant: Grid.ai, Inc., New York, NY (US)

(72) Inventors: Luis Capelo, New York, NY (US); Williams Falcon, New York, NY (US); Karolis Rusenas, New York, NY (US); Luca Antiga, New York, NY (US); Neven Miculinic, New York, NY (US)

(73) Assignee: Grid.ai, Inc., New York, NY (US)

( * ) Notice: Subject to any disclaimer, the term of this patent is extended or adjusted under 35 U.S.C. 154(b) by 0 days.

(21) Appl. No.: 17/494,542

(22) Filed: Oct. 5, 2021

(65) Prior Publication Data
US 2022/0107744 A1    Apr. 7, 2022

Related U.S. Application Data

(60) Provisional application No. 63/182,218, filed on Apr. 30, 2021, provisional application No. 63/173,666, filed on Apr. 12, 2021, provisional application No. 63/173,657, filed on Apr. 12, 2021, provisional application No. 63/173,674, filed on Apr. 12, 2021, provisional application No. 63/168,667, filed on Mar. 31, 2021, provisional application No. 63/088,908, filed on Oct. 7, 2020, provisional application No. 63/088,888, filed on Oct. 7, 2020, provisional application No. 63/087,406, filed on Oct. 5, 2020.

(51) Int. Cl.
*G06F 15/18* (2006.01)
*G06F 3/06* (2006.01)
*G06N 20/00* (2019.01)
*G06F 9/48* (2006.01)

(52) U.S. Cl.
CPC .......... *G06F 3/0644* (2013.01); *G06F 3/0604* (2013.01); *G06F 3/067* (2013.01); *G06F 3/0659* (2013.01); *G06F 9/4881* (2013.01); *G06N 20/00* (2019.01); *G06F 2209/505* (2013.01); *G06F 2209/508* (2013.01)

(58) Field of Classification Search
CPC .... G06F 3/0644; G06F 3/0604; G06F 3/0659; G06F 3/067; G06F 9/4881; G06F 2209/505; G06F 2209/508; G06N 20/00
See application file for complete search history.

(56) References Cited

U.S. PATENT DOCUMENTS

| | | | |
|---|---|---|---|
| 2012/0271927 A1 | 10/2012 | Shakirzyanov et al. | |
| 2018/0300174 A1 | 10/2018 | Karanasos et al. | |
| 2020/0097847 A1 | 3/2020 | Convertino et al. | |
| 2021/0089295 A1* | 3/2021 | Hart | G06F 9/546 |
| 2021/0182729 A1* | 6/2021 | George | G06F 9/5044 |

* cited by examiner

*Primary Examiner* — Wissam Rashid
(74) *Attorney, Agent, or Firm* — Jeffrey Schox; Diana Lin

(57) ABSTRACT

A system for large-scale machine learning experiment execution, including: a platform configured to determine an experiment set from a run specification and schedule a run to one or more clusters; and a set of agents configured to receive the experiment set from the platform and facilitate individual experiment execution through a cluster orchestrator.

20 Claims, 19 Drawing Sheets fervent - lemur - 358                                                    [INACTIVE]  ✕

Click to copy badge and paste on any repo. This badge fully reproduces this run!

[Grid AI | run]  ⊞  ⧉                                            Total cost $3.61

┌─────────────────────────────────────────────────────────────┐
│  No description provided.                                 ✎ │
└─────────────────────────────────────────────────────────────┘

Overview

Provider: ─────────────────────────────────────────────────────

CLOUD                              REGION
cc-2rp7d                           us-east-1

Machines: ─────────────────────────────────────────────────────

GPUs
4 NVIDIA TESLA V100          DISK SIZE              GPU
p3.8xlarge                   200 GB                 64 GB GPUs                         GPUs PER EXP           MAX NODES
32                           4                      10

MEMORY                                              INSTANCE
244 GB                                              93.8xlarge

DATASTORES: ───────────────────────────────────────────────────

NAME                         VERSION                MOUNT DIRECTORY
None                         None                   /opt/datastore/

FIGURE 14 fervent - lemur - 358 - exp2                    [COMPLETED] ✕

[Grid AI | run]  ⊕  ⧉                           Total cost $3.86   $
                                                Estimated Cost per Hour

Parameters   Artifacts   Build Logs   Stdout Logs

| | |
|---|---|
| Script | dcgan/main.py ↗ |
| dataset | cifar10 |
| dataroot | . |
| ngpu | 2 |
| cuda | true |
| lr | 0.0011745029756535037 |

Script Command

```
python dcgan/main.py \
   --dataset cifar10 \
   --dataroot . \
   --ngpu 2 \
   --cuda true \
   --lr 0.0011745029756535037
```

COPY ⧉

FIGURE 15

Experiments

| STATUS | ☐ RUN NAME ▲ | EXPERIMENT | RUN TIME | BILLED TIME | |
|---|---|---|---|---|---|
| ☐ ● Completed | fervent-lemur-358 08:11 AM | exp-3 | 00:14:09 | 00:13:23 | ... |
| ☐ ● Running | fervent-lemur-358 08:11 AM | exp-2 | 00:15:53 | 00:15:25 | ... |
| ☐ ● Completed | fervent-lemur-358 08:11 AM | exp-1 | 00:14:07 | 00:13:15 | ... |
| ☐ ● Completed | fervent-lemur-358 08:11 AM | exp-0 | 00:14:25 | 00:13:14 | ... |

▭ TENSORBOARD ▼ COLUMNS ▼ ACTIONS ▼ ⭳ CSV

Feedback

FIGURE 20

Sessions

| STATUS | NAME | CONNECT WITH | ACCELERATORS | TOTAL COST | HOURLY COST | BILLED TIME | ACTION | |
|---|---|---|---|---|---|---|---|---|
| ☐ ● Paused | calm-lynx-484 04/22/21 | ⊠ ⊙ ( ) | 4 V100 16GB | $2.04 | $12.85 | 00:09:52 | ● RESUME | ... |
| ☐ ● Paused | ginger-lemming-101 04/22/21 | ⊠ ⊙ ( ) | 8 V100 32GB | $7.8 | $32.77 | 00:14:03 | ● RESUME | ... |
| ☐ ● Running | screening-crow-903 08:13 AM | ⊠ ⊙ ( ) | 4 V100 16GB | $0.96 | $12.85 | 00:09:01 | ⏸ PAUSED | ... |

ACTIONS ▼

FIGURE 21

| experiment name | hyperparameter files | event logs | generated image |
|---|---|---|---|
| experiment 1 | hparams.yaml | events.out.log | |
| experiment 2 | hparams.yaml | events.out.log | |
| experiment 3 | hparams.yaml | events.out.log | |

FIGURE 23

SYSTEM AND METHOD FOR MODEL TRAINING ORCHESTRATION

CROSS-REFERENCE TO RELATED APPLICATIONS

This application claims the benefit of U.S. Provisional Application No. 63/087,406 filed 5 Oct. 2020, U.S. Provisional Application No. 63/088,888 filed 7 Oct. 2020, U.S. Provisional Application No. 63/088,908 filed 7 Oct. 2020, U.S. Provisional Application No. 63/168,667 filed 31 Mar. 2021, U.S. Provisional Application No. 63/173,657 filed 12 Apr. 2021, U.S. Provisional Application No. 63/173,674 filed 12 Apr. 2021, U.S. Provisional Application No. 63/173,666 filed 12 Apr. 2021, and U.S. Provisional Application No. 63/182,218 filed 30 Apr. 2021, each of which is incorporated in its entirety by this reference.

TECHNICAL FIELD

This invention relates generally to the machine learning field, and more specifically to a new and useful automated scaling platform in the machine learning field.

BRIEF DESCRIPTION OF THE FIGURES

FIG. 14 is an illustrative example of a summary of run metrics.

FIG. 15 is an illustrative example of an experiment specification.

FIGS. 18, 19, 20, and 21 are illustrative examples of run metric visualizations.

FIGS. 22 and 23 are illustrative example of artifacts generated by experiments from a run.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
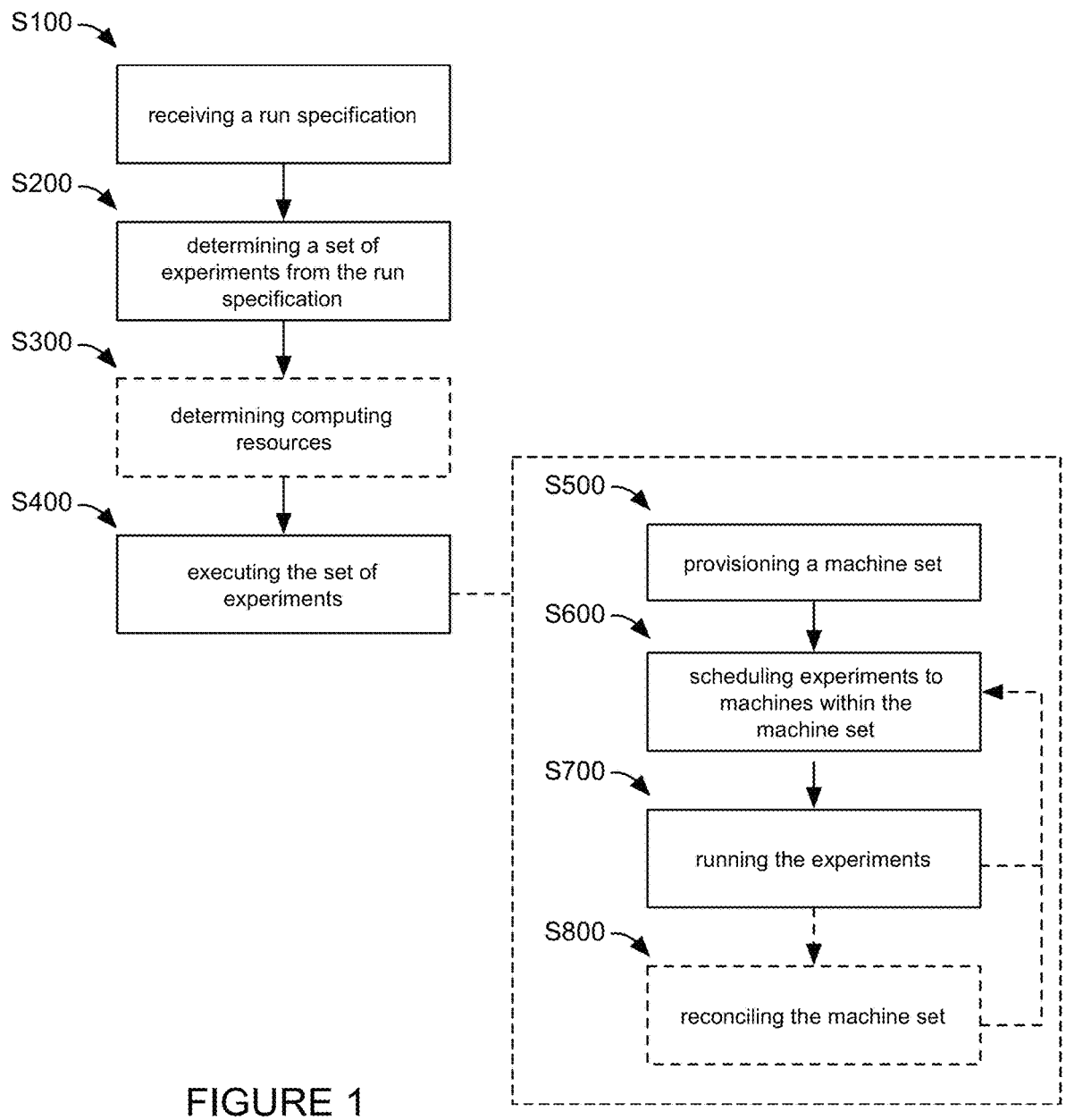
FIG. 1 is a schematic representation of the method.

As shown in FIG. 1, the method for training orchestration includes: determining a run specification S100; determining a set of experiments from the run specification S200; optionally determining computing resources S300; and executing the set of experiments S400. In variants, S400 can include: provisioning a machine set S500; and iteratively: scheduling experiments to machines within the machine set S600 and running the experiments S700. The method can optionally include reconciling the machine set S800; visualizing experiment results; cancelling experiments; and/or other processes. The method functions to automatically orchestrate large scale model training across different training parameter combinations and multiple machines (e.g., concurrently or asynchronously), which enables a user to train the same model at both a small scale and a large scale without manual model modifications, result monitoring, or active cloud computing management.

Figure 2:
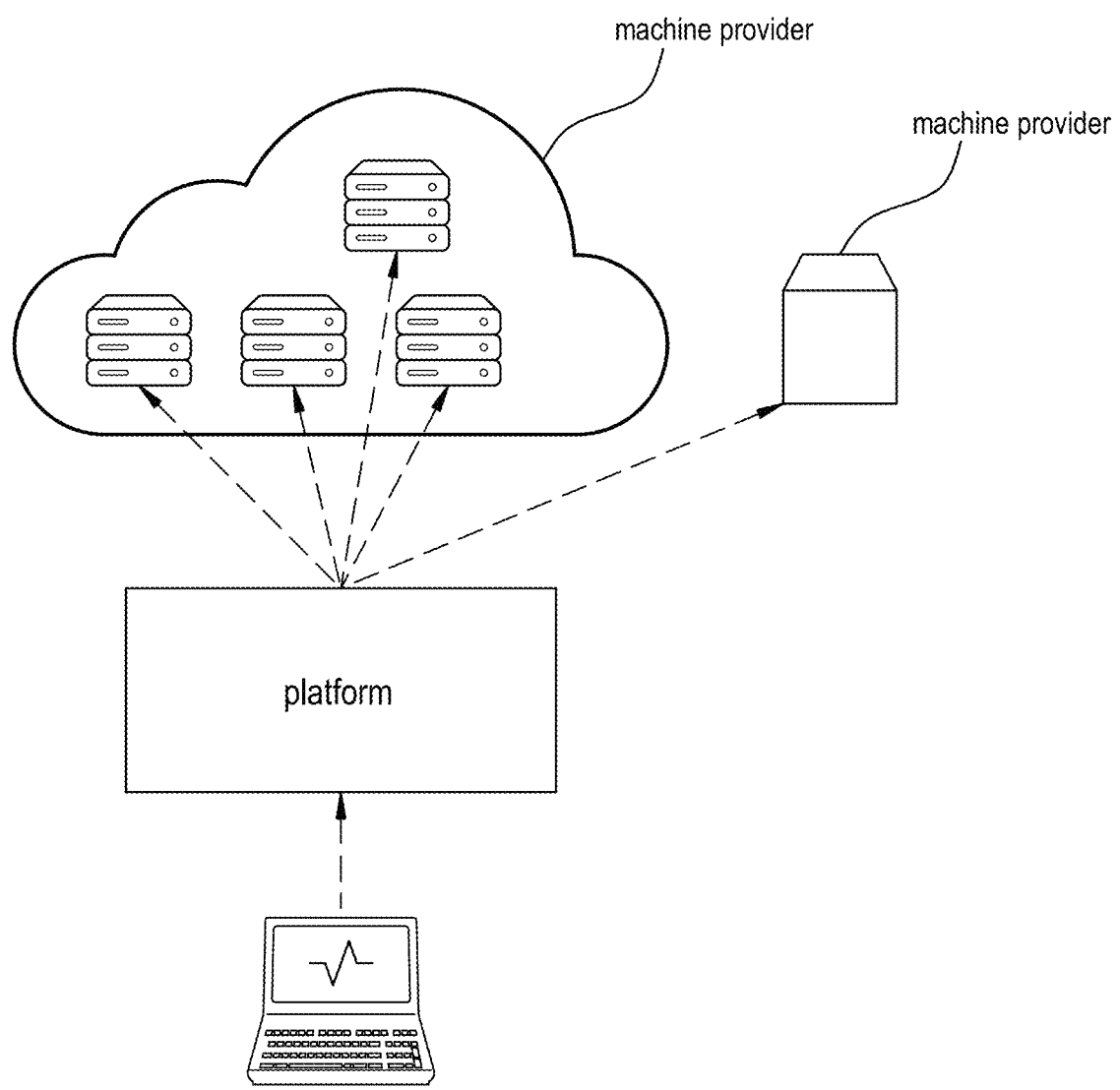
FIG. 2 is a schematic representation of the system in operation.
Figure 3:
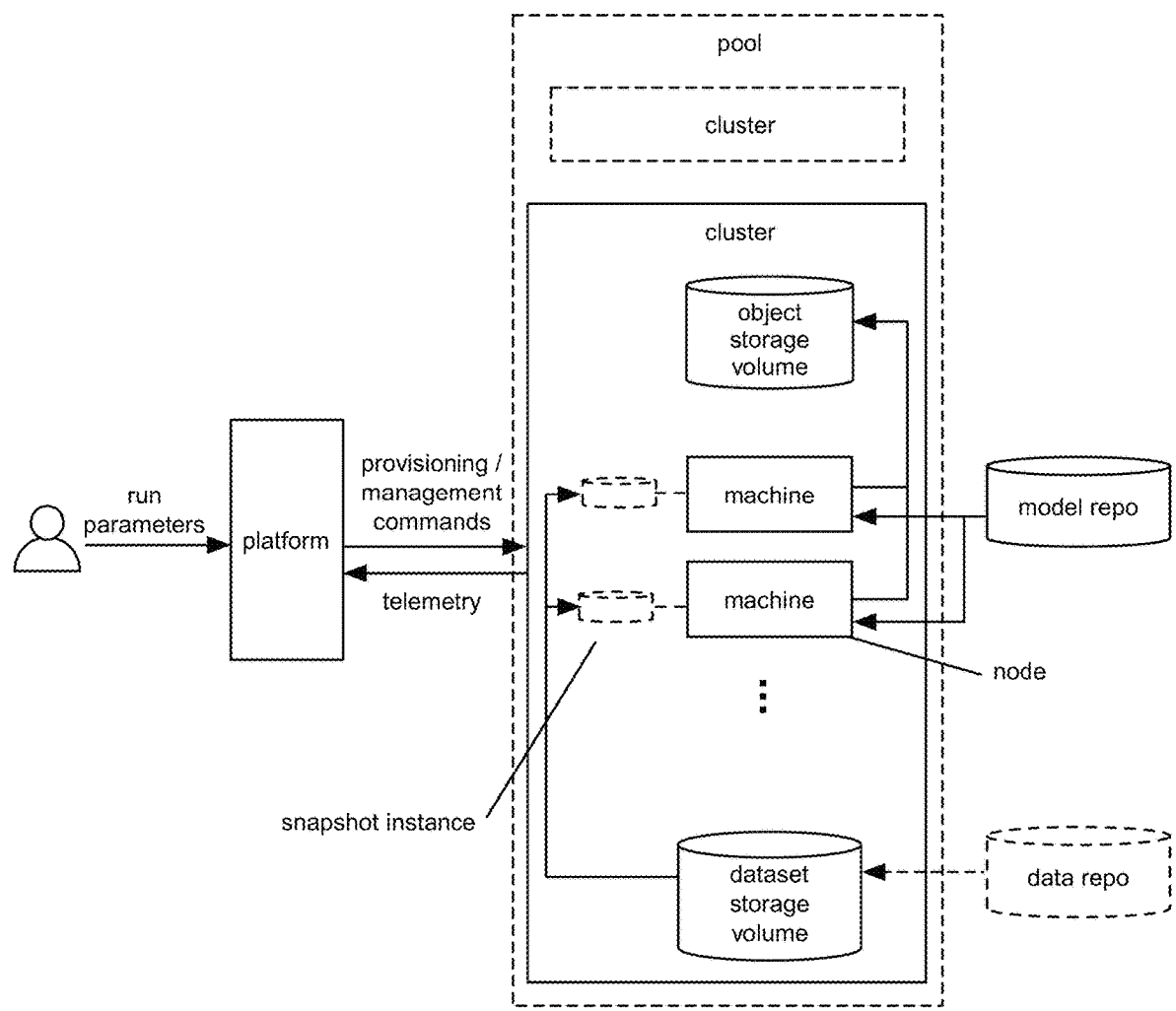
FIG. 3 is a schematic representation of a variant of the system.

The system for training orchestration can include: a platform interacting with a set of machine sets (e.g., examples shown in FIG. 2 and FIG. 3). In variants, the platform can additionally interact with a set of agents configured to control one or more cluster orchestrators, wherein each cluster orchestrator can control one or more clusters of nodes (e.g., example shown in FIG. 3).

2. Examples

In an illustrative example, a user can train a model based on a small dataset (e.g., locally or using a session), then use the platform to easily deploy multiple model training instances, each with different training parameters (e.g., different hyperparameter values, different machine types, different machine coordination types, etc.), in a remote computing system (e.g., cloud computing system, on-premises system) on behalf of the user. The platform orchestrates experiment (e.g., job) execution by the machines of the remote computing system, but is blind to the training experiment results (e.g., cannot access the trained models or training data). The user can then access the experiment results (e.g., the trained models) via the user's account on the remote computing system.

Figure 6:
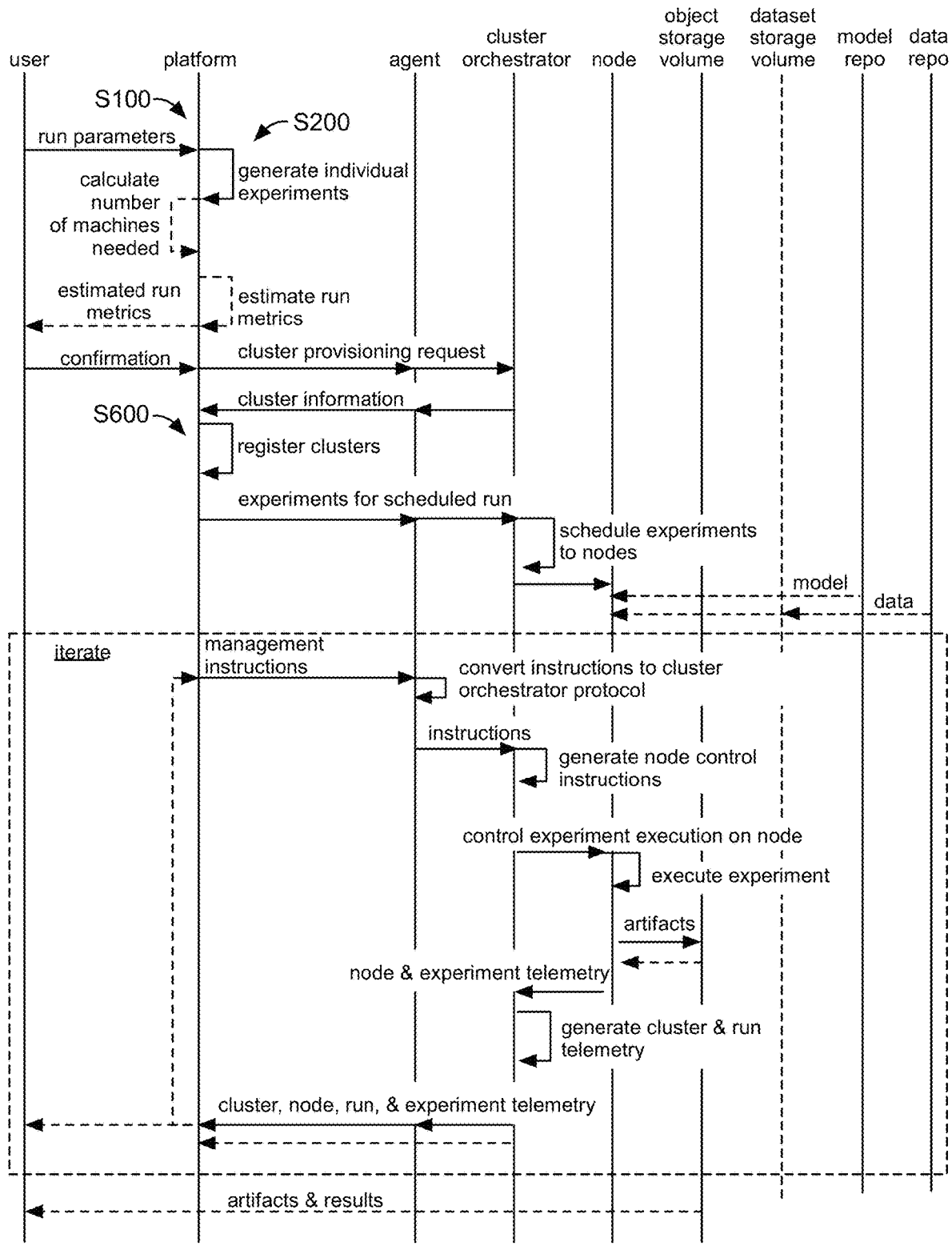
FIG. 6 is an illustrative representation of an example of the method.
Figure 7:
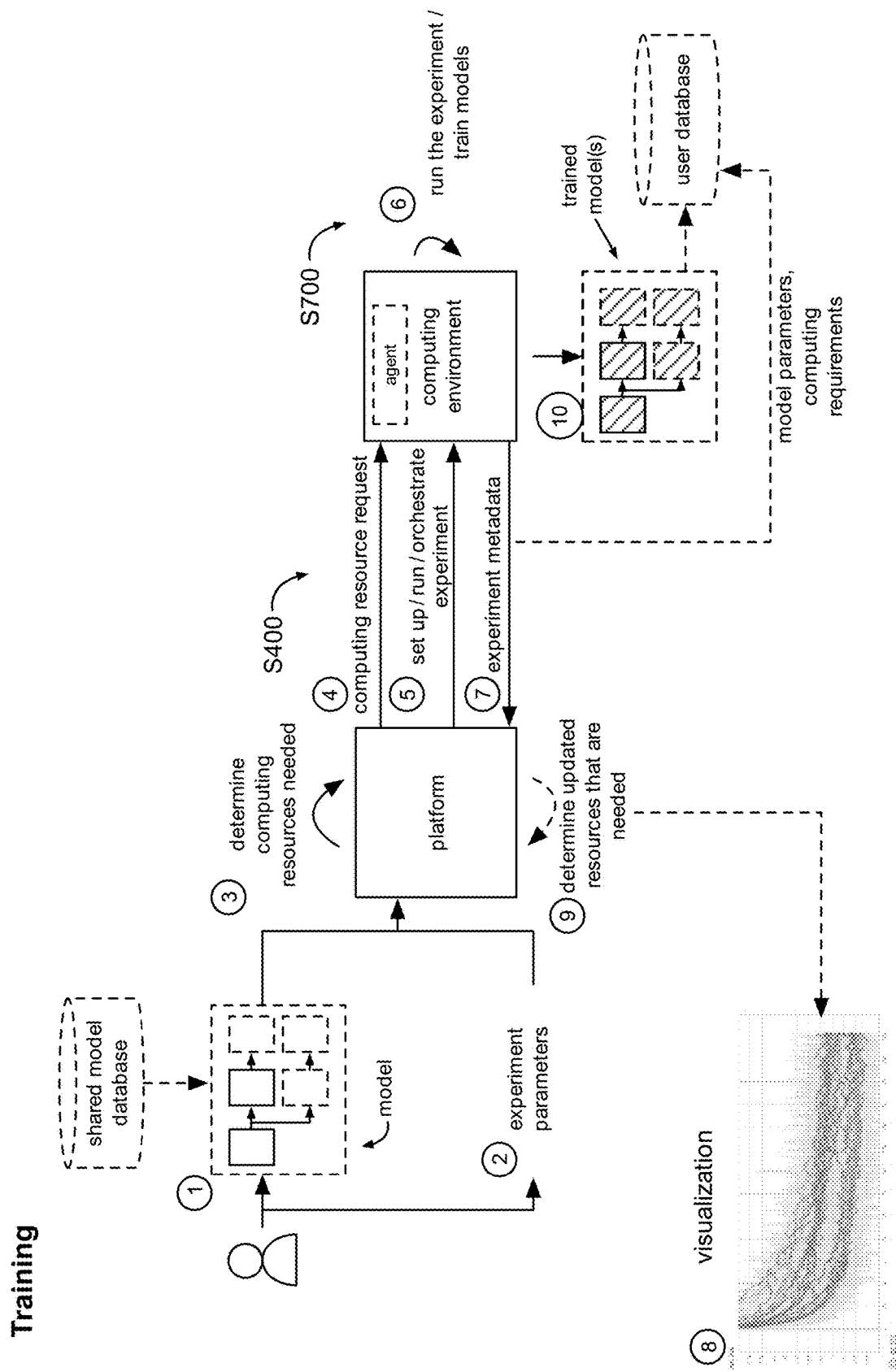
FIG. 7 is an illustrative representation of an example of the method.
Figure 8:
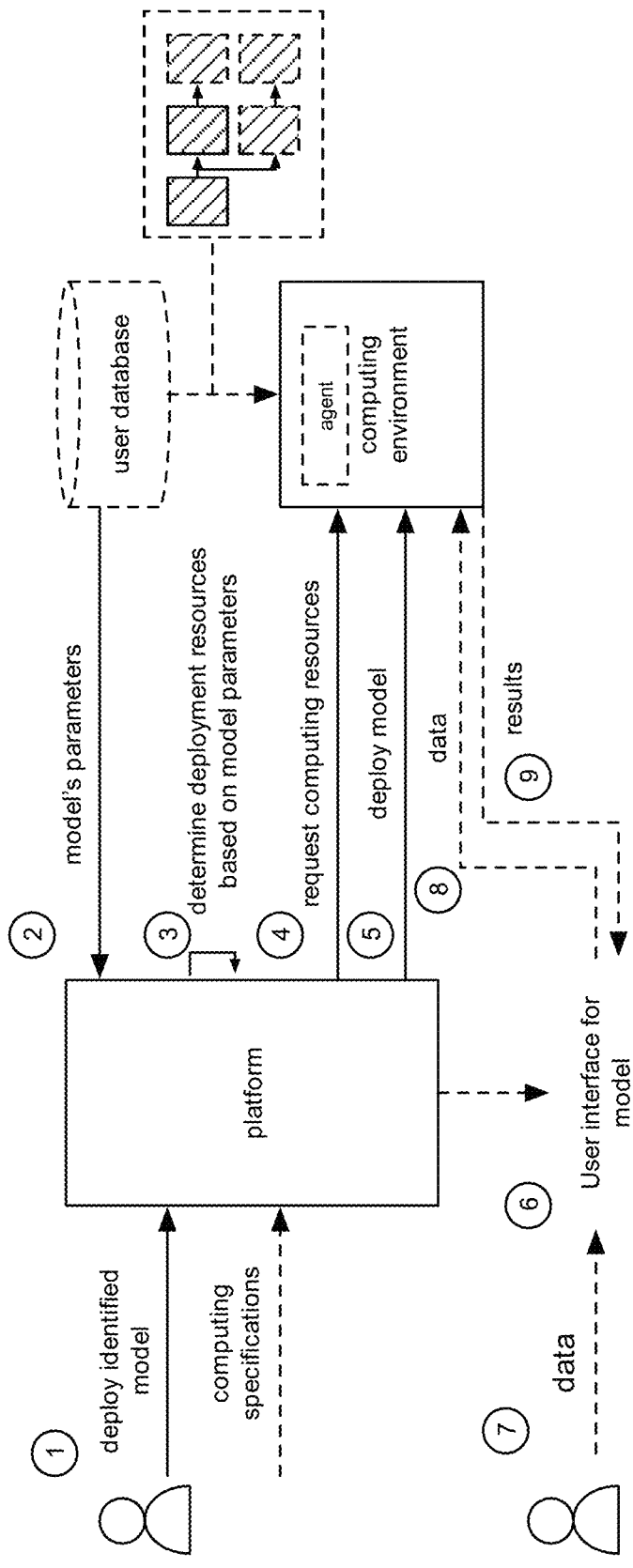
FIG. 8 is an illustrative representation of an example of applying the architecture to deployment.

In a second illustrative example (e.g., examples shown in FIG. 6 and FIG. 7), the method can include: receiving a set of run specifications for each of a set of runs, each run specification specifying value options for each of a set of experiment parameter values (e.g., hyperparameter value options); determining a set of experiments for each run, wherein each experiment is defined by an experiment configuration having a different combination of experiment parameter values (e.g., value options) specified by the respective run configuration; provisioning each of a set of clusters with an agent and a cluster orchestrator (e.g., before run specification receipt, after or responsive to run specification receipt); assigning a set of experiments (e.g., a run or a portion of a run) to a cluster and/or the agent associated with the cluster; and instructing the respective agent to execute the run (e.g., using a standard protocol), wherein the agent instructs the respective cluster orchestrator to schedule the experiments of the run to nodes of the cluster and manage execution of said experiments (e.g., using a cluster orchestrator-specific protocol). The agent can: monitor run progress, experiment progress, node progress, and/or cluster progress; optionally control the cluster orchestrator based on said data; determine telemetry based on said data; and send the telemetry to the platform, wherein the platform can control the agent and/or other agents based on the telemetry.

Figure 10:
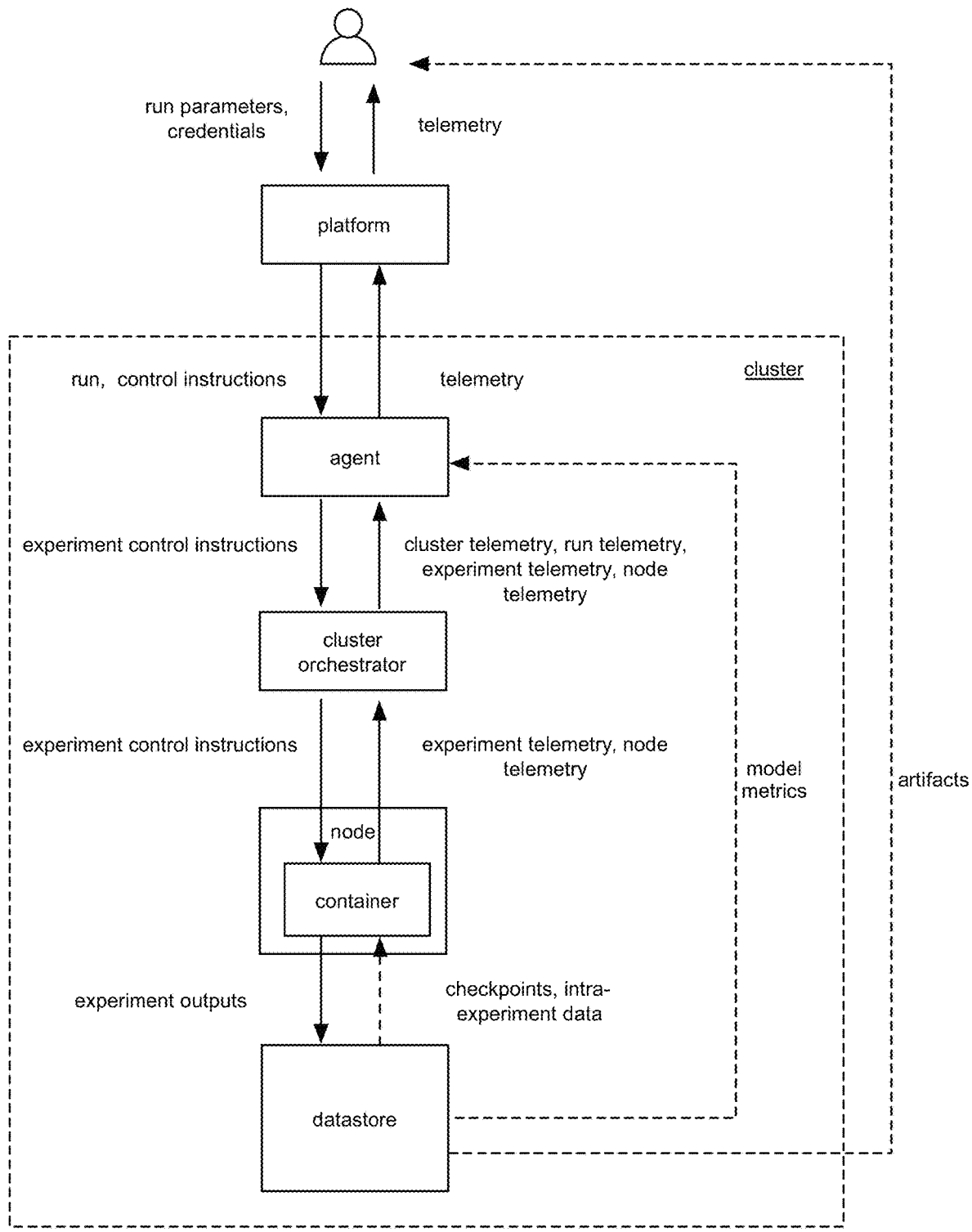
FIG. 10 is an example of data passed between components of the system.

In a third illustrative example (e.g., shown in FIG. 10), the system includes: a platform configured to receive a set of run specifications, determine a set of experiments—defined by different experiment specifications—for each run, and schedule each run to a different cluster; and a set of agents operating within the clusters and configured to control the cluster to: execute the set of experiments, determine telemetry about the run, and send the telemetry to the platform, wherein the platform controls high-level cluster operation (e.g., initialization, termination, etc.) based on telemetry received from agents. The system can optionally include a set of a set of cluster orchestrators, operating within the clusters, that sit between the respective agent and the cluster nodes, wherein the cluster orchestrators can be configured to control execution of the experiments from the scheduled run within nodes of the cluster (e.g., schedule experiments to nodes, initialize experiment execution, pause or terminate experiment execution, etc.).

3. Benefits

The technology can confer several benefits over conventional systems.

First, the technology automatically provisions, orchestrates, and manages computing resources to train a user-specified model using user-specified training data.

Second, variants of the technology provide a facile way for users to shift from small-scale training to large-scale training and experimentation by reducing the training commands to a single command (e.g., single or limited number of lines of code). For example, the single command can include: a platform call (e.g., "grid train", "grid run"), a set of metadata flags (e.g., "grid flags", descriptors, etc.), a model identifier or script identifier (e.g., the same model that they locally experimented with), a set of hyperparameter options, a set of machine types to run the experiments on, and the number of machines to run the experiments on. In an illustrative example, 64 experiments can be set up by running: grid run \-g_instance_type_8_v100_32gb\model.py --learning_rate "uniform(1e-5, 1e-1, 4)"--layers "[2, 4]", which runs the model model.py using 4 learning rates (uniformly selected between 1e-5 to 1e-1) and 2 layer options, each on 8 GPUs (4 learning rates×2 layer options×8 GPUs=64 GPUs and experiments).

Variants of the technology can further enable large scale experiment deployment responsive to a single action (e.g., submission of the single command), wherein other information needed to deploy the experiment—such as user credentials, run metric limits, and other parameters—can be automatically retrieved responsive to the single action.

In addition to automatically provisioning and controlling the requested machines, the technology can further reduce user overhead by automatically configuring, scheduling, and deploying the experiments. This frees users from manually testing different experiments to determine the best or optimal hyperparameter value permutation, from manually debugging experiments, and from waiting around for each experiment to complete before executing the next one (or from having to manage multiple experiments in parallel).

Variants of the technology can further reduce user overhead by: automatically splitting the dataset into training data and validation (or test) data; automatically validating the trained models; automatically generating hyperparameter permutations for model training (e.g., given a set of user-specified hyperparameter value options); automatically checking model dependencies and installing outdated or broken dependencies; automatically restarting the cluster after cloud computing system shutdown, and/or by automating other processes. The technology can also estimate and give users control of run metrics, such as cost or total runtime, before deploying the experiments to the machine set. The technology can also manage experiments across multiple clusters (e.g., in a pool), which enables large-scale experiments (e.g., exceeding conventional cluster management limits) to be concurrently managed and run.

Third, variants of the technology preserve user privacy and security, which can be particularly important when proprietary or sensitive training data (e.g., financial data, GDPR data, medical data, etc.) is used to train the models. These variants can keep all training data and resultant artifacts within the user's cloud computing system, and only allow the platform to read high-level machine and/or run telemetry for machine set management. In these variants, the user can independently access the object storage volumes (e.g., storing the model parameters) to access the experiment artifacts, such as the trained models, the generated files (e.g., synthesized images, synthesized text, etc.), the model metrics, and/or other artifacts.

In variants, this separation of data can be further enforced by an agent loaded onto the cluster, wherein the agent functions as a proxy or as a gateway for the platform (e.g., is the sole connection between the platform and the cluster). In examples, the agent can access experiment data, run data, node data, and/or cluster data to generate the telemetry for transmission to the platform. In this example, because the agent is running on the cluster, platform access to the agent can be terminated when the platform loses access to the cluster, such as when cluster is shut down (e.g., because the agent instance is deleted) or when the user revokes platform access to the cluster, which can further preserve data privacy.

Fourth, variants of the technology can further enable large-scale training and experimentation on heterogeneous computing resources (e.g., different processing units, different cloud providers, different cluster orchestrators, etc.) by using a modularized hierarchical architecture, where a single platform controls multiple agents, each agent controls one or more cluster orchestrators, and each cluster orchestrator controls a cluster including a set of nodes (e.g., controls the containers executing on each node).

In addition to enabling the system to scale horizontally, in variants, this modular hierarchical architecture allows the platform to use a unitary set of standard commands to control heterogeneous computing resources. For example, the platform can control the agents using standard commands (e.g., according to a platform-standard protocol), wherein each agent can translate the standard commands to cluster orchestrator-specific, processing unit-specific, cloud-provider-specific, and/or other endpoint-specific commands.

In another example, the agents can convert the cluster state, hardware state, cloud provider account state, and/or other information into a standard state (e.g., a standard representation), which can allow the platform to control heterogeneous computing systems using a single state machine, ruleset, or other control paradigm.

This architecture can also enable one or more runs to be split across different machine providers. For example, the experiments for a run can be split across one or more on-premises machines (e.g., provided by the user or other users) and one or more cloud computing platforms (e.g., using user credentials), wherein the experiments on each machine provider can be controlled in the same manner by the platform.

However, further advantages can be provided by the technology disclosed herein.

4. System

Figure 9:
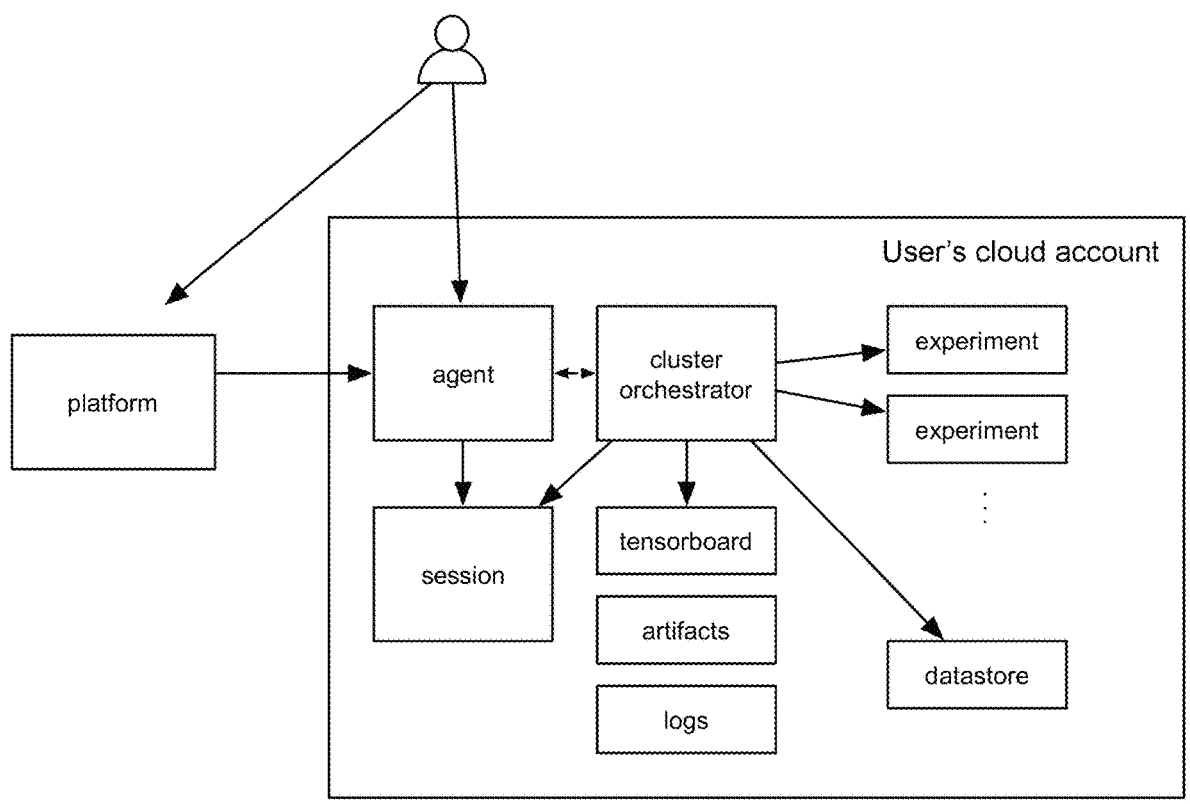
FIG. 9 is a schematic representation of an example of platform and user interaction with a machine provider.

The method is preferably performed by a system including a platform interfacing with a set of computing systems on behalf of a user (e.g., example shown in FIG. 2). The system can optionally include a set of agents that interface with the platform, and a set of cluster orchestrators that interface with the agents (examples shown in FIG. 4, FIG. 9, and FIG. 10. The system can optionally interface with a set of clusters, each including a set of nodes (e.g., machines); example shown in FIG. 3. The system functions to automatically deploy large-scale model training experiments on heterogeneous computing resources for one or more users.

The system functions to orchestrate experiment execution (e.g., job execution) across a set of computing resources. The system preferably orchestrates execution of one or more experiments across a set of clusters (e.g., a plurality of clusters), but can additionally or alternatively orchestrate experiment execution within a single cluster. The architectures and methods discussed herein can be equally applied to trained model deployment and/or inference.

Orchestration, as used herein, can refer to controlling operation of one or more software and/or hardware instances, or be otherwise defined. For example, orchestration can include: service discovery (e.g., discovering and/or registering hardware, such as nodes or clusters, or software, such as containers, pods, or deployments, etc.); load balancing (e.g., between clusters, between cluster sets, between nodes, between data storage, between runs, between computing resource providers, etc.); inter-machine coordination and/or communication (e.g., between different machines in a cluster, between different machines or clusters in a distributed experiment, etc.); configuring the computing environment (e.g., controlling agent installation, execution, etc.); controlling hardware and/or software progression through different states (e.g., generating and/or sending instructions to start, stop, restart, replace, kill, retry, and/or otherwise manage a hardware and/or software instance); monitor computing resource metrics (e.g., run time, execution cost, amount of memory consumed, amount of processing power consumed, etc.); controlling information storage and/or retrieval (e.g., write/read; e.g., without rebuilding container images or exposing secrets to the stack configuration; etc.); and/or otherwise controlling software and/or hardware operation.

The system can be used by one or more users (primary users), wherein different sets of experiments are executed on behalf of the each user. A user can be an entity, an individual, a client (e.g., third party service, third party platform, etc.), and/or other user. Each user can be associated with one or more platform accounts (user accounts). Each user account can be associated with one or more users. Each user can also have control over (e.g., provenance over) and/or accounts for computing resources (e.g., on-premises systems, cloud computing systems, etc.), cluster orchestration accounts, and/or other systems, platforms, and services.

The platform accounts can be stored with: a user identifier, access credentials, run information for one or more runs planned or executed by the user, and/or other information. The access credentials enable the user to delegate authority to the platform to act on the user's behalf within cloud computing systems, on-premises systems, cluster orchestration accounts, and/or in other systems, platforms, and services. The access credentials can be used to access: the user's cloud computing account, the user's model repository (e.g., local, remote), the user's datasets (e.g., stored locally, remote), and/or other endpoints. The access credentials can include: logins, access tokens (e.g., API tokens issued by the endpoint to the respective user account), and/or other credentials. The access credentials can be generated and controlled by the user (e.g., within the primary account) to delegate, grant, revoke, or otherwise control platform access to said primary account and/or service. The access credentials can be associated with: permissions for certain actions (e.g., write only, read only, read & write, etc.), access to certain functionalities (e.g., can request machines up to a certain volume or cost limit, can request certain services, can request GPUs but not TPUs, can generate presigned URLs to access data structures, etc.), access to certain computing resources (e.g., can access the nodes directly or indirectly, but not access the object store or the data store, etc.), and/or be associated with other permissions. Examples of access credentials that can be provided and/or stored include: cloud credentials (e.g., for a cloud provider, such as Amazon AWS™, Microsoft Azure™, Google Cloud Platform™, etc.), cluster orchestrator credentials (e.g., for a container orchestrator or container platform, such as Kubernetes™, Docker™, Apache Mesos™, etc.), data storage credentials (e.g., for Amazon S3™, EBS™, etc.), on-premises machines (e.g., logins, VPN credentials, etc.), and/or credentials for any other suitable computing resource.

The system can interact with a set of machine providers, which function to provide machines for user and/or platform use. The machine providers are preferably third parties, but can alternatively be the platform itself. Examples of machines (e.g., hardware; virtual machines, physical machines; etc.) can include bare metal machines, processing units, data storage, and/or any other suitable computing resource. The machines can be remote machines (e.g., cloud computing systems), on-premises systems (e.g., local to a user of the platform; running Hadoop™; etc.), and/or otherwise configured. Examples of machine providers can include: Amazon AWS™, Microsoft Azure™, Google Cloud Platform™, other users (e.g., providing on-premises systems), and/or other machine providers.

The system can be used with one or more cluster orchestrators, which function to control operation of the cluster and/or the plurality of nodes therein. The cluster orchestrators can additionally or alternatively facilitate artifact storage, determine cluster metadata (e.g., cluster state, cluster runtime, cluster costs, etc.), determine node metadata (e.g., node state, node runtime, node costs, etc.), determine experiment metadata (e.g., experiment or application state, experiment or application runtime, experiment or application costs, etc.), and/or perform other functions. The cluster orchestrators are preferably third parties, but can alternatively be the platform or an extension thereof (e.g., the agent). Examples of cluster orchestrators can include: cloud computing providers (e.g., AWS™, Google Cloud™, etc.), Kubernetes™, Docker™, Apache Mesos™, load balancers (e.g., NGINX™), and/or any other cluster orchestrator, container orchestrator, and/or computing environment orchestrator. The cluster orchestrators are preferably container orchestrators that control operation of containers executing within each node, but can alternatively be machine orchestrators that control operation of the node or machine itself, or be any other suitable orchestrator.

Examples of cluster orchestrators can include: Kubernetes instances (e.g., Kubernetes deployments including one or more pods; Kubernetes pods including one or more containers, etc.); Docker instances; and/or any other suitable cluster orchestrator.

The platform functions to orchestrate execution of one or more experiments across the set of computing resources, and can perform all or portions of the method. The platform is preferably a remote or cloud platform, but can alternatively be a local system (e.g., on-premises system) and/or other system. The platform can be centralized (e.g., "centralized platform") or distributed. The platform can be a multitenant system, single-tenant system, and/or support any suitable number of tenants. The platform can concurrently control execution of one or more experiment sets from one or more users across one or more machines or clusters.

The platform can interface with one or more types of computing resources. In variants, the computing resources used across all experiment sets and/or within a single experiment can be homogeneous (e.g., all of the same type) or heterogeneous (e.g., have varying types or varying configurations). The platform can interface with the computing resources directly or indirectly.

The platform can directly or indirectly interact with the computing resources. In a first variation, the platform stores and executes computing resource-specific calls (e.g., GPU driver calls, TPU driver calls, etc.). In a second variation, the platform stores and executes calls or syntax for a computing resource manager, such as a cloud computing system. In a third variation, the platform stores and executes calls for a cluster manager. For example, the platform can store and execute calls to a container orchestrator (e.g., Kubernetes™, Docker™, Apache Mesos™, etc.), wherein the container orchestrator controls operation of the containers and/or the machines executing the containers. In a fourth variation, the platform can interact with the computing resources using a standard protocol or set of calls. For example, the platform can interact with one or more agents using standardized instructions in a standard protocol, wherein the agents can convert the standardized instructions into cluster orchestrator-specific calls, machine-provider specific calls (e.g., cloud computing system-specific calls), machine-specific calls (e.g., driver-specific calls), and/or otherwise function as an intermediary between the platform and another system.

The computing resources can include a set of machines, storage, and/or other computing resources. The computing resources can be those of one or more cloud computing systems (e.g., Azure™, AWS™, Google Cloud Platform™, etc.), be an on-premises machine (e.g., owned, operated, and/or physically custodied by a user), and/or be otherwise owned, operated, or otherwise controlled. When cloud computing systems are used, the cloud computing system can optionally provide some orchestration, machine set monitoring, and/or other functionalities. Examples of machines that can be used can include: CPUs, GPUs, TPUs, IPUs, HPC, and/or other machines. Examples of storage can include: RAM, ROM, Flash, solid state drives, hard disk drives, and/or any other suitable storage.

The system (e.g., platform) preferably has access permissions to the computing resources, but can additionally or alternatively lack access permissions to the computing resources. In a first example, the platform can have its own cloud computing system account, wherein users use the platform's cloud computing resources for their experiments. In a second example, the platform can be associated with an on-premises system. In a third example, the user can have a cloud computing system account, and grant the platform permission to operate on their behalf (e.g., by providing an API token, login credentials, proxy access, etc.). In a fourth example, the user can control (e.g., physically control, digitally control, etc.) an on-premises system, and grant the platform permission to use the on-premises system (e.g., by providing an access endpoint, an IP address, login credentials, etc.). In the third and fourth examples, platform access to said computing resources can be restricted, such that the platform can only access the user's computing resources for experiments for the user, or can be open, such that the platform can access the user's computing resources for experiments for other users.

The platform can provision and manage the machine sets hosted by one or more machine providers. In particular, the platform can launch, provision, configure, orchestrate, and/or manage sets of machines (machine sets) directly, indirectly using a machine-side agent, indirectly using a set of cloud computing system calls, and/or otherwise controlled. The machine set can be: a pool of clusters, a cluster of machines, a single machine, a container (e.g., within the machine; e.g., example shown in FIG. 10), and/or any other suitable set of physical or virtual machines. The machine set can be homogeneous (e.g., from the same provider, the same processing unit types, etc.) or heterogeneous (e.g., from different providers, different processing unit types, etc.). A pool and/or cluster can be associated with an individual run, multiple runs (e.g., all associated with a user account), a single experiment, and/or any other suitable set of experiments. A machine can be associated with a single experiment, multiple experiments, a single run, or multiple runs. A machine is preferably associated with a single cluster at any given time, but can be associated with multiple clusters. A given machine set can contemporaneously (e.g., concurrently) and/or serially execute one or more experiment sets; alternatively, different clusters are used for different experiment sets.

In variants, the platform can interact with one or more clusters, wherein each cluster can include one or more nodes. Each node can include one or more machines, wherein the machines can be physical machines (e.g., processors, processing units, etc.) or virtual machines. Additionally or alternatively, each machine can include one or more nodes. The nodes of a cluster are preferably provided by the same machine provider (e.g., same cloud provider, same on-premises system, same network, etc.), but can alternatively be provided by different machine providers. In variants, each node can include a container, which can define a controlled computing environment to execute the experiment(s). The container can be specific to the node, specific to the machine, specific to the experiment, specific to the model or model class, specific to the data class (e.g., images, text, etc.), specific to the cluster orchestrator, and/or be otherwise specialized and/or generic. Experiments are preferably run as applications within the containers, but can be otherwise executed within the computing environment provided by the containers.

Each cluster and/or node therein is preferably controlled by a cluster orchestrator, but can alternatively be directly controlled by the platform. The cluster orchestrator can be: an instance of an agent, be separate from the agent, be a third party cluster orchestrator (e.g., a container orchestrator), the machine provider, and/or any other suitable system or module.

The platform can control individual cluster operation. In a first variation, the platform directly controls node operation. In a second variation, the platform only controls cluster operation (e.g., based on cluster and/or experiment set metadata received from the cluster). In a first embodiment of the second variation, the platform controls cluster operation by controlling a cluster orchestrator, wherein the cluster orchestrator controls node operation based on the platform instructions. In one example, the platform can delegate cluster orchestration to third party service (e.g., Kubernetes™), and manage multiple clusters based on cluster telemetry read from the third party service. In a second embodiment of the second variation, the platform controls cluster operation by controlling an agent, wherein the agent directly controls node operation or controls the cluster orchestrator, wherein the cluster orchestrator controls node operation.

The platform can control cluster operation based on telemetry received from the cluster, a state graph of expected cluster states (e.g., wherein each state or edge can be associated with a set of control instructions), a set of rules or heuristics, and/or any other suitable information. In one example, the platform can calculate a cluster metric (e.g., indicative of cluster performance, network bandwidth between machines, cost, current or anticipated runtime, etc.) based on the telemetry, and dynamically add or shut down clusters based on the cluster metric. Alternatively, the platform can manage the machine set directly or indirectly at any other suitable level.

However, the platform can otherwise directly or indirectly control individual cluster operation.

The platform can also control cluster set operation (e.g., control interactions between clusters). In a first variation, the clusters interact with each other via the platform, wherein the platform receives, interprets, and/or forwards messages between clusters. In a second variation, the clusters can interact directly with each other (e.g., using a mesh protocol), wherein the platform can register each cluster and provide the cluster information (e.g., identifier, etc.) to other clusters that need to communicate with said cluster. However, the platform can otherwise facilitate inter-cluster operation.

In a first embodiment, the platform controls inter-cluster operation and does not control intra-cluster operation. In a second embodiment, the platform controls both inter-cluster and intra-cluster operation.

Figure 4:
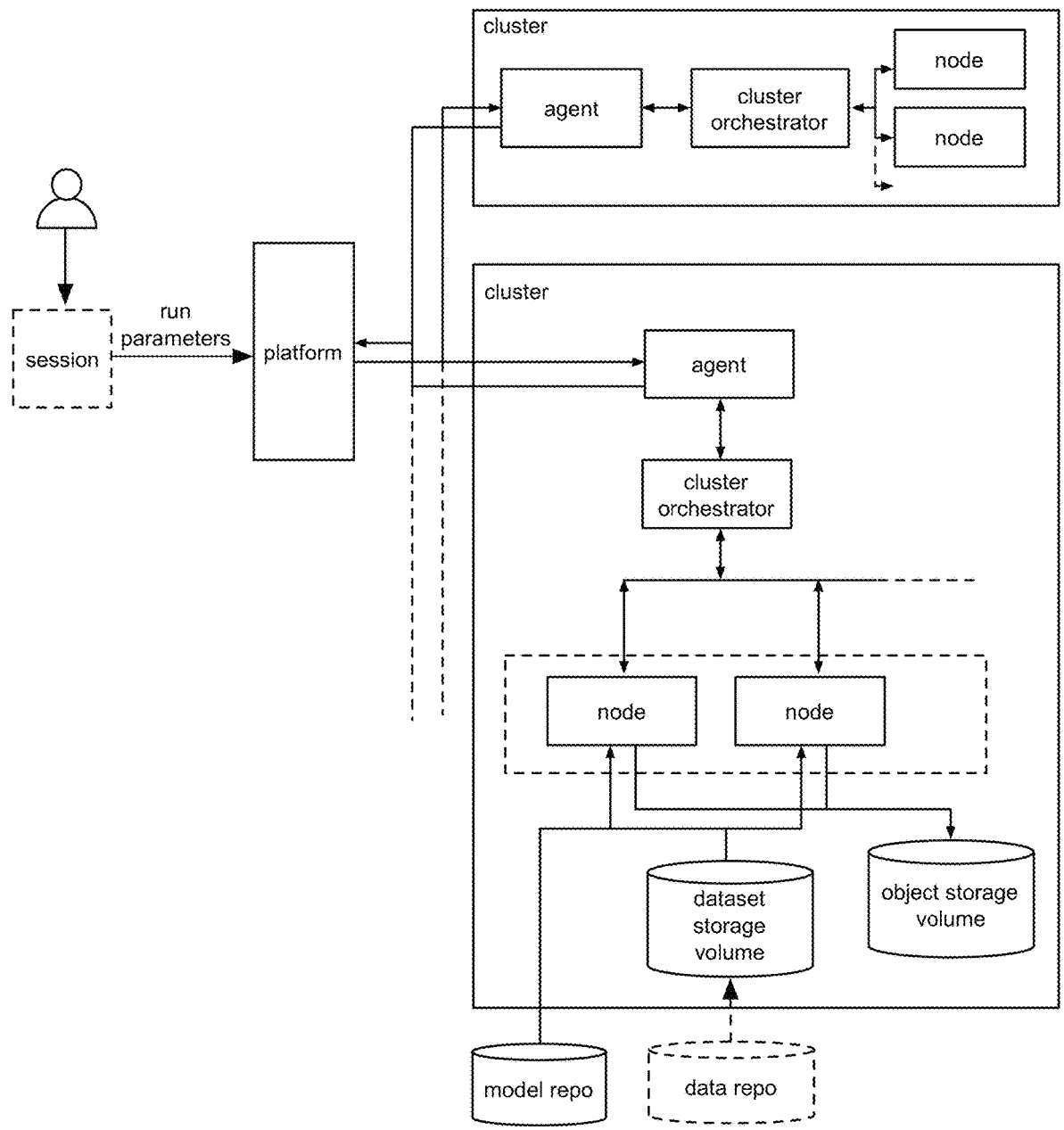
FIG. 4 is a schematic representation of a second variant of the system.

The platform can optionally provision and manage storage volumes hosted by the cloud computing platform (e.g., examples shown in FIG. 3 and FIG. 4). The volume(s) size and type can be: automatically specified by the platform (e.g., based on defaults, based on the user's dataset, based on the amount of anticipated data generated by the experiments, based on the estimated cost, etc.); manually specified by the user; specified by prior experiment (e.g., executed in a user session, executed locally, etc.), and/or otherwise specified. The storage volumes can be specific to: a pool, a cluster, a machine, and/or any other suitable machine unit. The storage volumes can be mounted to the machine set or cluster as a volume, as a snapshot, be downloaded, and/or otherwise associated with the machine set. The data stored by the storage volumes can be public or private, static or dynamic (e.g., dynamically read from a data source), persistent or temporary, and/or have other characteristics. The storage volumes can be local or remote. The storage volumes (and/or certain datasets therein) can be accessible or inaccessible to the platform, the agent, and/or the user. Storage volumes can include: dataset storage volumes, object storage volumes, and/or any other suitable set of volumes. The dataset volume can store the training dataset, such as the training data, the test data, and/or other data. The dataset volume (or other storage volume) can optionally store snapshots (e.g., incremental backups; backup that loads data in the background; EBS snapshot; etc.) of the dataset storage volume. The object storage volume can store the experiment outputs (e.g., artifacts), such as the models (e.g., trained, untrained), the model parameters (e.g., weights), files generated by the model (e.g., logs, generated images, etc.), the experiment identifier, and/or other information. The object storage volume can optionally store: experiment metadata, the run parameters, and/or other information. Additionally or alternatively, the storage volumes can include: a relational store (e.g., where services write domain data); a current state store (e.g., where the last observed and last desired states for each object are stored); a cache (e.g., that caches frequently accessed data); and/or other storage volumes.

The platform (e.g., central system) is preferably blind to some or all of the data stored in the storage volumes (e.g., artifacts, training data, trained models, etc.), but can additionally or alternatively be able to access the stored data.

However, the platform can otherwise interact with the computing resources.

The system (and/or platform) can additionally include one or more agents, which function to interface between the platform and the computing environment (e.g., cluster, node, container, etc.), examples shown in FIG. 4, FIG. 6, FIG. 7, FIG. 9, and FIG. 10. For example, each agent can function as an interface between a given cluster and the platform, or function as an extension of the platform into the cluster.

The agents are preferably cluster orchestrator-specific, but can alternatively be cluster-orchestrator agnostic. The agents are preferably machine-provider specific (e.g., the system includes a different agent for on-premises vs. AWS vs. Google Cloud), but can alternatively be machine provider agnostic. The system preferably includes different agents for different combinations of: machine providers, cluster orchestrators, machine types, and/or other cluster parameters, but can alternatively include a single agent for each cluster parameter value or include a generic agent. For example, the system can include a first agent for Kubernetes™ on AWS™, a second agent for Docker™ on AWS™, a third agent for Kubernetes™ on Google Cloud™, and a fourth agent for Docker™ on Google Cloud™. In a second example, the system can include a first agent for Kubernetes™ and a second agent for Docker™, wherein the Kubernetes and Docker agents can be deployed to any cloud computing service. In this variation, each agent is preferably capable of translating the standard platform instructions into instructions specific to the cluster orchestrator and/or machine provider associated with said agent (e.g., the Kubernetes™ agent can translate standard instructions into Kubernetes calls; the AWS™ agent can translate standard instructions into AWS calls; etc.). However, the agents can be otherwise configured. Different agents executing on different clusters sharing the same cluster parameters are preferably different instances of the same agent (e.g., same agent template); alternatively, they can be different agents. Alternatively, the system can include a single agent for different cluster parameter combinations. However, the system can include any other suitable type of agent.

The agents are preferably executed on the associated cluster (e.g., execute on a machine provided by the machine provider, within a container on the cluster, etc.), but can alternatively be executed on the platform or on any other suitable computing environment. Instances of the agents are preferably installed on (e.g., reside on, executed on) the cluster (e.g., on the machine provider's machines), but can alternatively be installed and/or executed on the platform. The agents can run on a node of the cluster, across multiple nodes of the cluster, on a management system of the cluster, and/or be otherwise executed.

Each agent instance preferably manages a single cluster, but can alternatively manage multiple clusters. Each cluster preferably includes a single agent, but can alternatively include multiple agents. Agents can operate independently from other agents, or can be grouped together into agent groups (e.g., with other agents managing experiments from the same run). In the latter variant, the agents can reconcile different parts of the state of the same parent object (e.g., a run), or otherwise cooperatively operate.

The agents can store access credentials (e.g., access credentials for the respective cluster, for the respective cluster orchestrator, etc.), user preferences, metric thresholds (e.g., cost thresholds, runtime thresholds, etc.), experiment set data (e.g., experiment schedules, experiment specifications, etc.), one or more translation modules (e.g., translating standard instructions to cluster orchestrator-specific instructions and/or machine provider-specific instructions and vice versa, etc.), and/or any other suitable information.

The agents preferably determine telemetry from the cluster, send the telemetry to the platform, optionally receive cluster control instructions (e.g., generated based on the telemetry) from the platform, and optionally control the cluster (e.g., via the cluster orchestrator) based on the cluster control instructions. However, the agents can read and/or write a predetermined set of data (e.g., from the experiment or machine set) to a set of predetermined endpoints (e.g., platform endpoints), and/or perform any other suitable functionality.

The telemetry can be used to: generate standard instructions for the cluster, schedule experiment sets (e.g., runs) to clusters (e.g., the same or different cluster), schedule experiments to nodes (e.g., the same or different cluster), schedule experiment sets to cluster orchestrators, determine experiment specification values (e.g., wherein prior results and/or telemetry influence subsequent experiments), determine per-user usage of computing resources, generate billing, and/or otherwise used. The telemetry can be used as discussed above by: the platform, the agent, the cluster orchestrator, and/or by any other suitable system. The telemetry can include: cluster metrics, run metrics, node metrics, experiment metrics, and/or other metrics or telemetry. The telemetry can be generated by the agent (e.g., calculated, sampled, etc.), retrieved or received by the agent (e.g., from the cluster orchestrator, from the object store, etc.), and/or otherwise determined.

The experiment metrics can include: the name of the experiment set that the experiment belongs to (e.g., run name), the experiment name, the experiment's run time (e.g., determined based on the estimated epoch run time and an estimated number of estimated epochs needed; determined based on historical run times for similar experiments, etc.), the experiment's billed time, the experiment state (e.g., queued, paused, pending, running, completed, stopped, failed, etc.), the model metrics, and/or other metrics.

The run metrics can include: the run name (e.g., project name), the total number of experiments in the run (e.g., estimated based on the hyperparameter sweeps), the number of experiments in each state (e.g., queued, paused, pending, running, completed, stopped, failed, etc.), the total run duration, the average run duration, the total cost, the average cost, model metric statistics (e.g., mean model metric value, model metric range, model metric distribution, etc.), each machine or experiment's status (e.g., pending, running, error, success, etc.), each experiment's operational information (e.g., cost to date, estimated cost, current runtime, estimated runtime, amount of compute consumed, amount of power consumed, etc.), run-generated filepaths (e.g., pointers to memory locations within the object storage volume), the machine provider information (e.g., name, region, etc.), the computing resources for the run, and/or other metrics (e.g., example shown in FIG. 14).

The cluster metrics can include: uptime, cost, the cluster identifier, the runs assigned to the cluster, the number of nodes or machines in the cluster, the cluster orchestrator identifier (e.g., instance identifier, type identifier, etc.), the types of machines in the cluster, the cluster state, the number of nodes within the cluster in each node state, and/or other cluster metrics.

The node metrics can include: node uptime, node cost, node identifier, the set of experiments assigned to the node, the machines in the node, the node state, and/or other node metrics.

The agents can additionally or alternatively: oversee the workflow of an experiment set, control the cluster orchestrator, control the cluster directly, control the nodes directly, control any datastores, storage volumes, or other computing resources mounted to the cluster, access data inaccessible to the platform, facilitates storage of artifacts generated by the experiments (e.g., within an object store connected to the respective cluster), generate access credentials to access cluster computing resources (e.g., generate a presigned URL to access artifacts within the object store), generate summaries of data inaccessible to the platform, log node or cluster state, communicate node or cluster state to the platform, log experiment or run state, communicate experiment or run state to the platform, and/or perform other functionalities.

The agents can function as or include translation modules that translate the standard platform instructions to endpoint-specific instructions (e.g., using a lookup table, a mapping, etc.). Examples of endpoint-specific instructions can include: cluster orchestrator-specific instructions, container orchestrator-specific instructions, node-specific instructions, container-specific instructions, machine-specific instructions, machine provider-specific instructions, and/or any other suitable set of instructions. The agent additionally or alternatively can: submit healthchecks, update resource status information (e.g., for experiments, sessions, etc.), fetch resources (e.g., from experiments, sessions, users, etc.), authorize SSH access to the session (e.g., in the cluster), and/or perform other functionalities.

The agents can also control cluster operation independently from the platform. For example, the agent can store its own state graph, generate cluster control instructions based on cluster data, and directly control the cluster by controlling the nodes or indirectly control the cluster by controlling the cluster orchestrator based on the cluster control instructions. However, the agents can otherwise control the nodes.

The agents can additionally or alternatively include: a run module (e.g., configured to estimate and/or log the cost and/or resources for a run), a logging module (e.g., executing on each machine; configured to export experiment logs to object storage), an artifact module (e.g., executing on each machine, agent, node for the experiment, sidecar container, or other layer; configured to read the local file created by the experiment-specific model instance and write the local file to object storage), a log parsing module (e.g., configured to parse logs, such as Tensorboard logs, and store said logs in object storage; executing on each machine, agent, node for the experiment, sidecar container, or other layer, etc.), proxy module (e.g., executing on the cluster;

configured to process telemetry from the object storage and transmit telemetry to the platform when called), a datastore builder (e.g., configured to build the datastore), an image builder (e.g., configured to build container images), a run controller (e.g., configured to reconcile the run assigned to the respective cluster), a tensorboard controller (e.g., configured to reconcile tensorboards), a session controller (e.g., configured to reconcile sessions), an experiment controller (e.g., configured to reconcile experiments), a cost agent (e.g., configured to intercept cost telemetry, such as from the machine provider), an authorization agent (e.g., configured to relay authorization between the platform and the respective endpoint), a proxy (e.g., configured to allow SSH/TTP access through the platform), and/or any other suitable module.

The system is preferably used with a set of models, which are trained through execution of an experiment. The system preferably interacts with (e.g., creates, trains, etc.) multiple instances of the same initial model (e.g., for a given user, across different users), but can alternatively interact with a single instance of a given model.

The models are preferably machine learning models, but can be other models. Examples of models that can be used can include: regression models, classifiers (e.g., binary classifiers, multiclass classifiers, support vector machines, etc.), Bayesian models, graph-based models, random forest models, generative models, clustering models, ensemble methods, neural networks (e.g., CNN, DNN, RNN, KNN, etc.), adversarial models, NLP models, and/or other models. Each model can be: a single model, a cascade of models, an ensemble of models (e.g., example shown in FIG. 7), and/or include any number of sub-models. The models can be standard models (e.g., provided by a standards body, by the platform, etc.), be a custom model (e.g., written by the user), and/or otherwise determined.

Each type of model can be associated with a different set of hyperparameters; alternatively, different models can share hyperparameters. Examples of hyperparameters can include: learning rate, mini-batch size, number of layers, regularization, c and y (e.g., for support vector machines), k (e.g., for KNNs), decay rate, and/or any other suitable hyperparameter.

Each model can be identified by a model identifier. The model identifier can be locally unique, globally unique, or nonunique. Examples of model identifiers that can be used include: an endpoint identifier (e.g., a URI, a filepath, a function name, etc.), a name, a hash (e.g., of the model code), and/or other identifiers.

The models can be stored in one or more model repositories, wherein each model repository can store one or more models (e.g., example shown in FIG. 3). The model repository can be local (e.g., on a user device) or remote (e.g., stored in cloud storage, such as Github™). The model repository can have limited access (e.g., require access credentials for access) or unrestricted access. The model can be untrained, pretrained, trained on a small dataset (e.g., locally trained), and/or otherwise trained. Each model can be identified by a model identifier (e.g., URI, URL, local filepath, alphanumeric identifier) or otherwise identified.

The system can optionally be used with a data repository that functions to store the user's dataset(s) (e.g., example shown in FIG. 3). The data repository can be the same cloud computing system as that running the machine set, a different cloud computing system, a local system, an in-house server system, and/or any other suitable data repository. The platform can have limited access (e.g., require access credentials for access) or unrestricted access to the data repository. Each dataset can be identified by a data source identifier (e.g., URI, URL, filepath, alphanumeric identifier) or otherwise identified.

This can further allow the user to train on large datasets (e.g., more than 5 GB, 10 GB, 100 GB, 500 GB, 1 T, etc.), which can be directly mounted to the cloud computing resources.

The system can function to run a set of experiments (e.g., a "run"), wherein each experiment trains (or attempts to train) one or more models. Each experiment preferably trains a single model instance, but can alternatively train multiple model instances (e.g., concurrently or serially). Each model instance is preferably trained using the data from the datastore and a set of hyperparameter values, but can additionally or alternatively be trained using other information. Experiment execution is preferably controlled by the cluster orchestrator (e.g., as a job or application scheduled to a container or node), but can alternatively be controlled by the agent, by the platform, and/or by any other suitable system. Each run can include one or more experiments. Additionally or alternatively, a run can be a process that generates one or more experiments for execution, and/or execute the experiments.

Each experiment is preferably associated with a cluster, more preferably a node, but can alternatively be associated with any other suitable machine set. Each experiment can be assigned, scheduled, executed on, and/or otherwise associated with the cluster, node, and/or machine. The experiment is preferably automatically scheduled (e.g., after experiment specification determination, after a request is received, etc.), but can be manually scheduled or otherwise scheduled. The experiment can be scheduled by: the platform, the agent, the cluster orchestrator, and/or by any other suitable system. For example, the platform can assign (e.g., schedule) a set of experiments to a cluster, wherein the agent or cluster orchestrator of the cluster can schedule individual experiments to individual nodes. In another example, the platform can directly schedule each experiment to an individual node within a cluster (e.g., wherein the node or a cluster orchestrator manages which experiment should be run on the node at any given time). Experiments can be prioritized within the experiment set for scheduling (e.g., based on importance, experiment parameter diversity, manually-assigned priority, etc.), be unprioritized, and/or be otherwise prioritized. However, the experiments can be otherwise scheduled for execution.

Each experiment can generate one or more experiment outputs, which can be stored in the object store (e.g., for the cluster, for the experiment set, etc.), provided to the agent, provided to the platform, provided to a user, and/or otherwise managed. Examples of experiment outputs can include: artifacts, logs, model metrics, experiment metrics, and/or any other suitable output. Artifacts can include: the trained model (e.g., weights, equations, etc.); model checkpoints (e.g., for resuming training later); files created during the training process (e.g., image generated by the models; Tensorflow records; etc.); intermediary results; model outputs; and/or other artifacts. Logs can include: run logs (e.g., print statements, script outputs, etc.), build logs (e.g., dependency install success/fail, model loading success/fail, etc.), event logs (e.g., a timeseries of events), output logs (e.g., a timeseries of experiment outputs), and/or any other suitable record of any other suitable data. Model metrics can include classification metrics, regression metrics, and/or metrics for any other suitable model class. Examples of model metrics can include: accuracy, precision, recall, F-score, ROC (receiver operating characteristic), AUC (area under curve), error (e.g., mean squared error, mean absolute error, etc.), confidence scores, loss, and/or any other suitable metric indicative of model performance. Experiment metrics can include: the experiment state (e.g., failed, succeeded, pending, paused, etc.), experiment run time, experiment cost, computing resources consumed (e.g., amount of memory, amount of processing power), and/or any other suitable metric indicative of experiment state or performance.

Each experiment can be associated with experiment telemetry. The experiment telemetry can be generated by the experiment, be generated by monitoring the experiment (e.g., determined from experiment metrics or metadata), and/or otherwise determined. Experiment telemetry can include: the experiment identifier, the experiment specification, the cluster that the experiment is scheduled to, the node that the experiment is scheduled to, the experiment metrics, and/or any other suitable data.

Each experiment can be associated with an experiment specification or configuration, which can define values for each of a set of experiment parameters. The experiment specification can be: specified in (and extracted from) a run specification; generated from a set of value options specified in a run specification; automatically generated (e.g., randomly, deterministically, based on historical values, iteratively, at run time, etc.; by a run, etc.), and/or otherwise generated.

Figure 11:
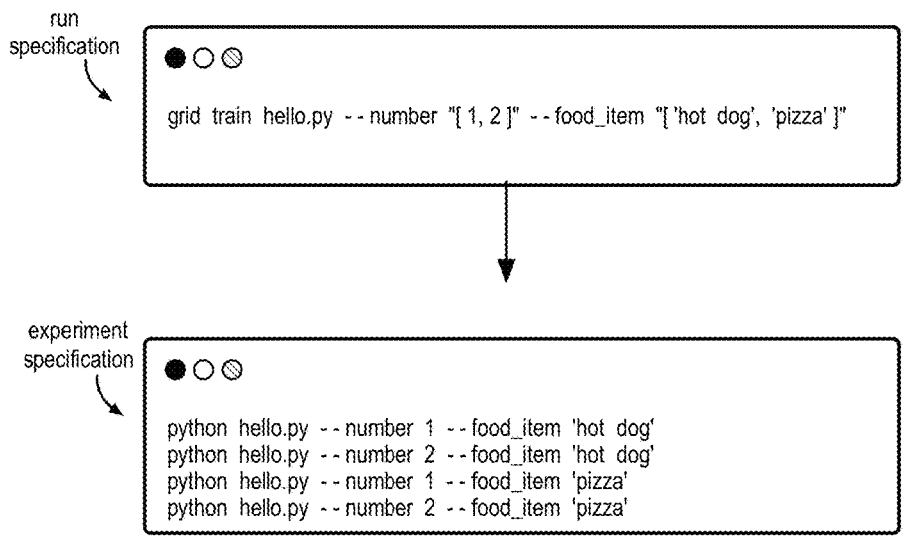
FIG. 11 is an illustrative example of generating multiple experiments from a request.
Figure 12:
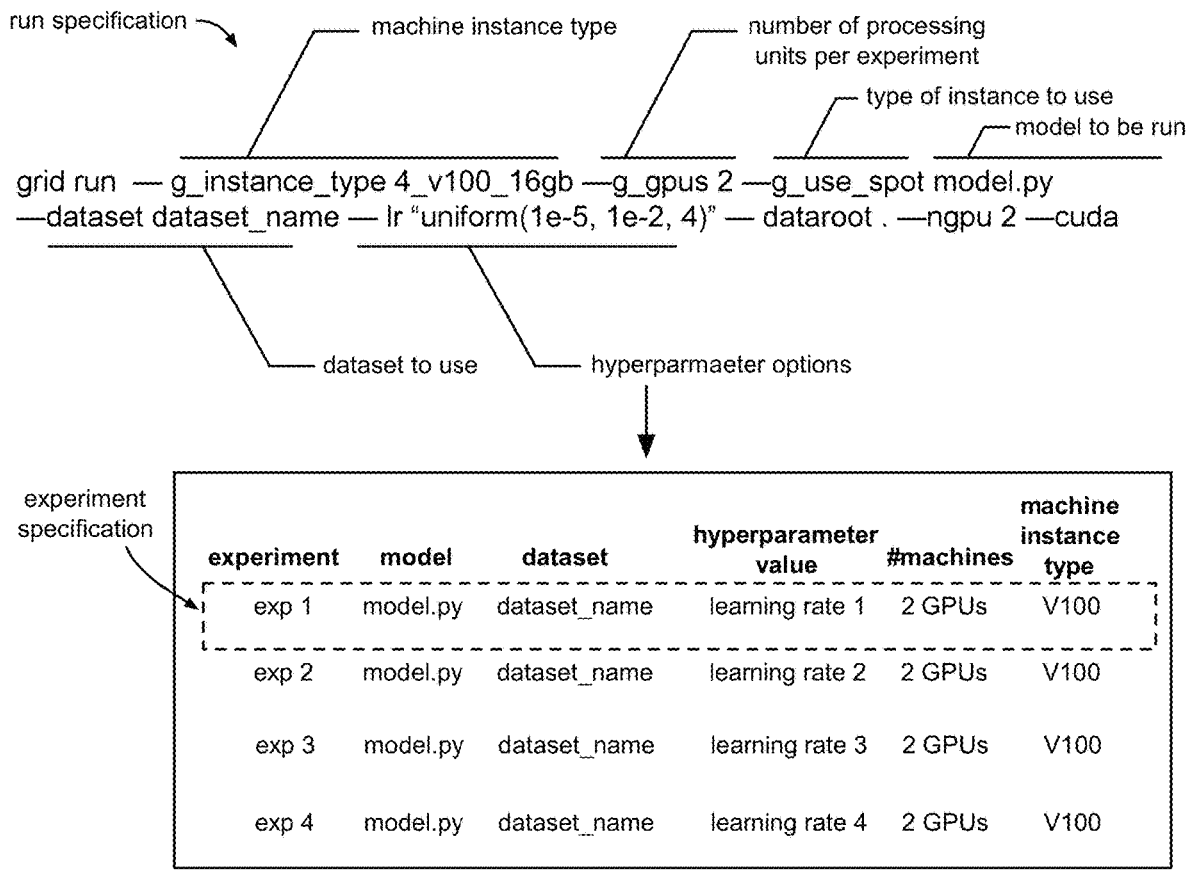
FIG. 12 is a second illustrative example of generating multiple experiments from a request.

The experiment specification can include values for one or more experiment parameters (examples shown in FIG. 11, FIG. 12, and FIG. 15). Experiment parameters can include one or more: model identifiers, datastore identifiers, a hyperparameters, numbers of machines (e.g., processing units) for the experiment, the type of machine (e.g., processing unit) for the experiment, distributed processing types for the experiment, computing models to apply (e.g., CUDA, etc.), distributed training strategies (e.g., DDP, DDP2, etc.), value search strategies, value combination strategies, and/or other experiment parameters used to define the structure, training strategies, data, and/or other parameter of a model experiment. Each experiment specification preferably includes one value for each experiment parameter, but can alternatively include multiple values for each experiment parameter. However, the experiment specification can be otherwise constructed.

Hyperparameters can include variables that determine the model structure (e.g., number of hidden units, number of layers, etc.), training variables (e.g., learning rate, momentum, number of epochs, batch size, etc.), and/or other variables. Hyperparameters can be expressed as: lists, functions, arrays, or otherwise specified. For example, hyperparameters can include: any alphanumeric list (e.g., --flag "[0, 1]" Calls two scripts with --flag 0 and --flag 1), string list (e.g., --flag "['x', 'y']" Calls two scripts with --flag 'x' and --flag 'y'), numpy distribution (e.g., --flag "uniform(0, 1, 3)" Calls 3 scripts with each sampled value), list of integers (e.g., --flag "range(0, 5, 2)" Calls 3 scripts with: --flag 0, --flag 2, --flag 4), and/or any other suitable hyperparameter variable.

Figure 13:
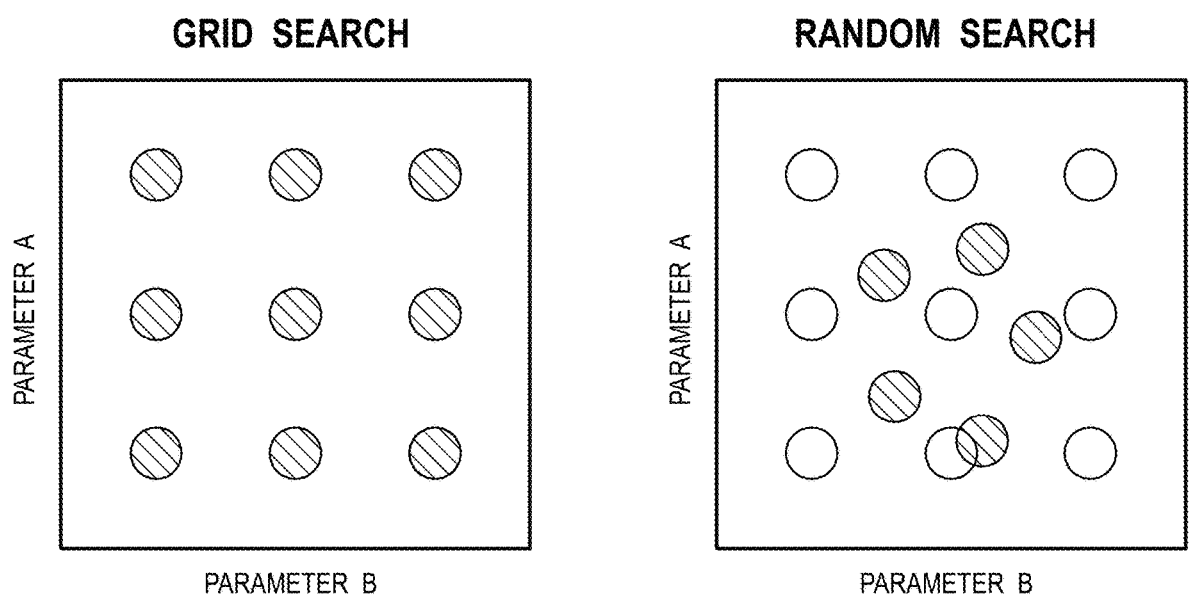
FIG. 13 is an illustrative example of two hyperparameter combination strategies.

The hyperparameter combination strategies can define how the hyperparameter values can be combined, and can include: grid search (e.g., example shown in FIG. 13), random search (e.g., example shown in FIG. 13), Bayesian optimization, manual search, and/or search strategy (e.g., specified by -g_strategy). The combination strategy can be: specified by the run specification, manually determined, a default strategy, selected based on experiment metrics (e.g., based on the accuracy, precision, etc.; based on whether the acceleration and precision are trending upward or downward; etc.), and/or otherwise selected. The resultant hyperparameter combination preferably includes a combination of hyperparameter values (e.g., values for each of a set of hyperparameters), but can be otherwise defined. The value for each hyperparameter can be determined from a set of value options for the hyperparameter, be randomly determined, or be otherwise determined. The value options can be received from a user, be a predetermined set (e.g., for the dataset, for the machine type, etc.), and/or be otherwise determined. The value options can be discrete (e.g., integer values, specified values), continuous, binary, and/or otherwise configured. The hyperparameter combination can be determined: randomly, according to a rule set, according to a predetermined search method (e.g., grid search), and/or otherwise determined. Examples of hyperparameters that can be specified in the experiment specification include: the learning rate, a minibatch size, a regularization hyperparameter, c & y (e.g., for support vector machines), k (e.g., for KNNs), size, decay, and/or any other suitable hyperparameter.

The experiment specification can be manually defined, automatically defined, or otherwise defined.

An experiment set can include one or more experiments, and can function as a working unit for the platform, the agent, or another system.

The experiments within an experiment set preferably have different experiment specifications (e.g., unique experiment specifications, unique combinations of experiment parameter values, etc.), but one or more of the experiments can alternatively share experiment specifications. The experiment specifications for the experiments within an experiment set are preferably automatically generated from a single run specification, but can alternatively be generated from multiple run specifications, individually specified, or otherwise defined.

The run specification functions to define the search space for experiment specification combinations. The run specification (e.g., run parameters) preferably includes different value options for each of a set of run parameters, but can additionally or alternatively include other information. The run parameters can include experiment parameters, experiment population parameters (e.g., the relationships between experiment parameter values), run metric constraints (e.g., maximum cost, maximum runtime, etc.), and/or other parameters. The run parameters preferably includes values for each experiment parameter. For example, the run specification can include one or more values for one or more: model identifiers, datastore identifiers, hyperparameters, machine numbers per experiment, machine types per experiment, the distributed processing type for the experiment, computing models to apply (e.g., CUDA, etc.), network processing strategies (e.g., DDP, DDP2, etc.), and/or other experiment parameters. The value options can be continuous or discrete, and can be expressed as: a value, an array or vector, a range, a distribution (e.g., uniform distribution over a range), text, an external reference (e.g., reference to a function, library, database, session storage, etc.), and/or be otherwise expressed. Experiment specifications are preferably generated from the run specification, wherein the system can automatically determine different combinations of experiment parameter values to define different experiment specifications. However, the experiment specifications can be the same as the run specifications, or be otherwise related to the run specification.

A run specification can additionally or alternatively include the information provided by the user to set up the experiments, such as the name of the run, the number of machines for each experiment, the type of machines for each experiment, the model to train, the hyperparameters to try, and/or other information. The machine set information can include: the experiment-machine assignment (e.g., including the specific experiment parameters for the experiment, such as the model identifier and hyperparameters; the machine identifier, etc.), the machines per cluster, the clusters per pool, and/or other information.

The run specification can also include selection parameters (e.g., permutation selection criteria, etc.), which specifies how different combinations of experiment parameter values should be selected from the run specification. Examples of selection parameters include: the number of values to select for each experiment parameter, the sampling frequency, the sampling distribution (e.g., uniform sampling), the sampled values' relationships, the selection methodology (e.g., random, grid search, etc.), and/or other selection parameters. For example, a run specification with "gpus 2 . . . -lr "uniform(1e-5, 1e-2, 4)" will generate 4 experiments, each executing on 2 GPUs with a learning rate uniformly sampled from a distribution bounded by $1 \times 10^{-5}$ and $1 \times 10^{-2}$.

The run specification can also include run parameters, such as the cluster identifier, the cloud computing system to use, the cloud computing service to use (e.g., a persistent instance, a spot instance, etc.), a maximum or minimum runtime, a maximum or minimum cost, security parameters (e.g., which encryption type to use), and/or any other suitable run parameter. However, the run specification can be otherwise configured.

The run specification can include (or be determined from) a single-line request (e.g., wherein all experiment parameter values are expressed in a single line), a matrix, a function configured to generate parameter values based on metrics derived from previously executed experiments (e.g., Bayesian hyperparameter optimization), and/or otherwise configured. The run specification can be received from a user, received from a session (e.g., from a Jupyter notebook), be randomly determined, or be otherwise determined. In an example, the single-line request can specify a set of model identifiers, a set of datastore identifiers, and a set of hyperparameter values (e.g., hyperparameter value options). However, the experiment specifications can be otherwise determined.

The experiments within an experiment set are preferably related, but can alternatively be unrelated. In a first variation, the experiments within an experiment set (e.g., "run") are generated from the same run specification. In a second variation, the experiments within an experiment set are associated with the same platform account or entity (e.g., user account). In a third variation, the experiments within an experiment set are associated with the same cluster. In a fourth variation, the experiments within an experiment set are associated with the same node. In a fifth variation, the experiments within an experiment set are associated with different users and/or runs. In this variation, the experiments can be assigned to the experiment set: randomly, based on cluster or node availability, based on user-defined labels (e.g., assigned to each experiment, to each run, etc.), and/or otherwise assigned. However, the experiments can be assigned to experiment sets based on model class, estimated experiment cost, estimated experiment time, dataset parameters (e.g., dataset size, data type, etc.), and/or otherwise assigned.

Experiments within the experiment set are preferably executed on the same cluster, but can alternatively be executed across multiple clusters (e.g., for distributed data processing (DDP) or distributed training methods). Experiment sets can be assigned to clusters based on: the user account (e.g., experiments for a user are assigned to the clusters associated with the user account), cluster availability, cost, runtime, security, an optimization (e.g., over one or more run parameters), and/or any other suitable parameter. For example, a run can be spread across multiple computing systems based on the estimated run cost, estimated run runtime, security, and/or other optimization.

Experiment sets can be assigned to clusters by the platform, by the agent, and/or by any other suitable system. Experiments are preferably automatically scheduled to machines (e.g., clusters, nodes, etc.) responsive to receipt of the run request and/or experiment specification determination (e.g., without human intervention), but can alternatively be scheduled with intermittent human input (e.g., confirmation, assignment, etc.).

The system can optionally include an experiment reconciler that functions to reconcile distributed experiments. For example, given a desired state and an observed state for a resource, the experiment reconciler can determine how to operate on or control the system (e.g., determine which functions to call) to transition said system from the observed state to the desired state (e.g., such that observed state and desired state coincide). This can be done using a state machine, decision tree, state graph, set of rules, set of heuristics, using a model trained to estimate the next action, and/or otherwise accomplished. Distributed experiments can include: a single experiment distributed across multiple clusters, an experiment set (e.g., "run") distributed across multiple clusters, and/or be otherwise defined. The experiment reconciler can be part of the platform, part of the agent, part of the cluster orchestrator, a separate component, and/or be otherwise configured. The experiment reconciler can pass experiment data (e.g., layer outputs, model outputs, training data, target labels, etc.) between different clusters, nodes, agents, and/or cluster orchestrators; reconcile the states of the nodes and/or clusters executing different portions of the experiment; store all experiment data within a centralized data store; retrieve data from the centralized data store for the experiment segment; and/or perform other functionalities.

The system can optionally be used with or include a set of sessions (e.g., interactive sessions, user sessions, etc.), which function to allow users to develop, analyze, and prototype models, experiments, and/or other data. In variants, this allows a user to prototype, debug, and/or analyze their runs or experiments (e.g., on a live machine) before training at scale (e.g., using the platform). A session can include an instance that gives users interactive access to the running environment, such as through a notebook or through remote SSH access, but can alternatively be a program executing on the machine, a tunnel, and/or be otherwise configured. The session is preferably executed on a live machine (e.g., live virtual machine, machine or container instance that the user has direct access to, etc.), but can additionally or alternatively be executed on an offline machine (e.g., wherein the user does not have direct access to said machine, wherein the processes are executed independent of user control or access, etc.). The machine can be local to the user, remote from the user (e.g., be a cloud computing instance), be a distributed system, and/or be any other suitable machine. The session can use: the same dataset as that used by the experiments (e.g., the same data source, a local copy of the data source, etc.), a sample of the dataset used by the experiments (e.g., randomly sampled, sampled to obtain a representative data subset, etc.), and/or any other suitable data. The session can store the session data in an object store or data volume, wherein the session data can be directly sent to the platform (or copied from the session) for training at scale. Session data can be for a set of experiments (e.g., a run) or a single experiment. Session data can include: specifications (e.g., run specifications, experiment specifications, etc.), metrics (e.g., experiment metrics, run metrics, model metrics, etc.), experiment artifacts, and/or any other suitable data. Session data can be periodically stored, stored before session pause or termination, and/or at any other suitable time. Session data can be stored as a snapshot, copied over to persistent storage, and/or otherwise stored.

The system can optionally be used with a user interface, which functions to enable the user to interact with the platform. The interface can optionally enable the user to directly or indirectly interact with the nodes of the clusters, the object stores, the data volumes, and/or any other suitable information. For example, the interface can present a matrix of experiments with the associated artifacts for ease of user comparison.

In a first variation, the users can only directly interact with data accessible to the platform, and must log in through the cluster orchestrator platform and/or machine provider platform (e.g., cloud computing system) to directly interact with the machines and/or data stored by the machine provider. In a second variation, the users can directly interact with the data stored by the machine provider through the user interface, wherein the platform can create a secure channel to the object store or download the requested information to the platform storage for user interaction. In a third variation, the platform can create a presigned URL to the requested endpoint (e.g., presigned by the endpoint or the machine provider providing the endpoint), such that the user can directly interact with the endpoint (e.g., object store, node, etc.) via the presigned URL. However, the user can otherwise interact with the data.

5. Method

Figure 5:
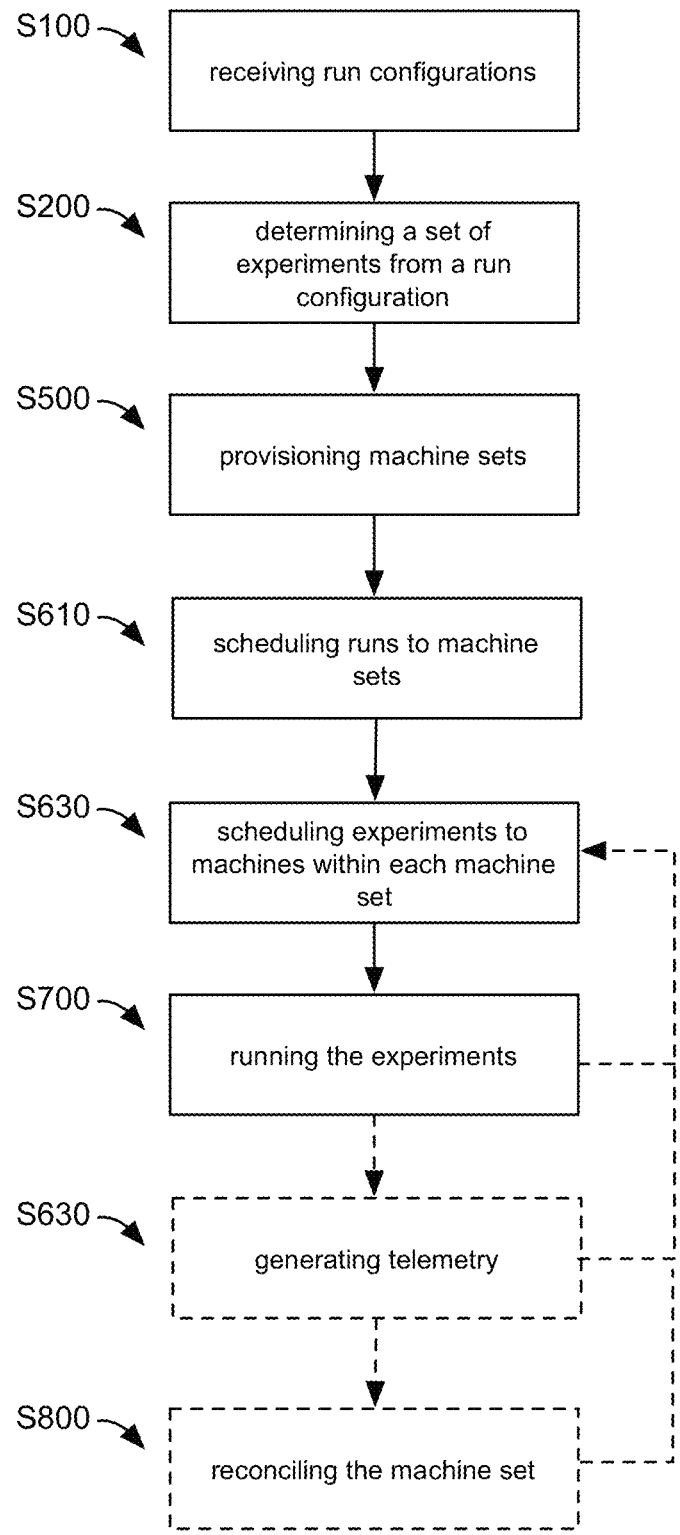
FIG. 5 is a schematic representation of a variant of the method.

The method for training orchestration includes: determining a run specification S100; determining a set of experiments from the run parameters S200; optionally determining computing resources S300; and executing the set experiments S400. In variants, S400 can include: provisioning a machine set S500; and iteratively: scheduling experiments to machines within the machine set S600 and running the experiments S700 (e.g., examples shown in FIG. 5 and FIG. 6). The method can optionally include reconciling the machine set S800; visualizing experiment results; cancelling experiments; and/or other processes (e.g., examples shown in FIG. 6 and FIG. 7). The method functions to orchestrate large scale training of multiple model instances (e.g., across multiple machine sets, across heterogeneous machines, etc.). The method is preferably performed by the system discussed above, but can alternatively be performed by any other suitable system.

Determining a run specification S100 functions to receive the information to set up an experiment set. The run specification is preferably received by the platform, but can be received by the agent or by any other suitable system. The run specification can include a set of value options for a set of run parameters. The run parameters are preferably received in a single line request (e.g., a single command line, a single API call; e.g., examples shown in FIG. 11 and FIG. 12), but can alternatively be received in multiple lines, as a multiline script, or in any other suitable format. The run parameters can include: the run identifier, the model identifier (e.g., for the model to train), the data source identifier (e.g., for the dataset to use), the machine types to use, the number of machines per experiment to use, a set of experiment parameters, run metric constraints (e.g., maximum runtime, maximum cost, etc.), and/or any other suitable set of values for any other suitable run parameter. For example, the run parameter can include one or more of: number of a given type of machine per experiment (e.g., --g_cpus number of CPUs per experiment; --g_gpus the number of GPUs per experiment), define the number of GPUs and memory (e.g., --ginstance_type, etc.), filepaths (e.g., --g_config path to a yaml config file), cloud computing system to use, cloud credential to use (e.g., --g_credential specify the cloud credential to use), name of datastore to mount, version of datastore to mount (e.g., --g_datastore_version, etc.), directory where to mount datastore (e.g., --g_datastore_mount_dir, etc.), size of disk attached to machine (e.g., --g_disk_size, etc.), additional context for the run (e.g., --g_description, etc.), machine learning framework (e.g., --g_framework, etc.), a fail-safe limit to avoid large workloads (e.g., --g_max_nodes, etc.), machine RAM (e.g., not GPU RAM, --g_memory, etc.), name of run (e.g., --g_name, etc.), whether to skip all warning and prompts (e.g., --ignore_warnings, etc.), which computing resource instance type to use (e.g., persistent instances, spot instances, etc.), hyperparameters (e.g., learning rate, number of layers, etc.), the discrete or continuous set of hyperparameter values for each specified hyperparameter, a value sampling pattern (e.g., uniform, skew, bimodal, etc.), a distributed processing scheme (e.g., DP, DDP, etc.), communication protocols, run parameter combination pattern (e.g., random combination, grid search, etc.), the number of experiments to create, selection parameters (e.g., how values for different parameters should be selected), stop conditions (e.g., maximum cost, maximum time, minimum model performance value, etc.), and/or other run parameters. One or more values can be received for each run parameter. Different run parameters can have different requirements. For example, some run parameters can have default values (e.g., the machine type will default to CPUs), while other run parameters require value specification (e.g., model identifier, data identifier, etc.).

The run specification can be: received from a user (e.g., a user account); retrieved from a datastore; retrieved from a local session (e.g., from a Jupyter session, etc.); randomly determined; determined using a specified search strategy; be default values; automatically determined (e.g., by a platform); learned from prior runs (e.g., sharing similar experiment characteristics to the current set of experiments); and/or otherwise determined. The run specification can be received via: a command line interface (e.g., using "grid run -- . . . "), a graphical user interface (e.g., wherein run specifications can be typed in, dragged and dropped, etc.), a local session, and/or otherwise received. Each run specification is preferably associated with a user or user account, but can alternatively be associated with any other suitable entity. One or more run specifications can be concurrently or sequentially determined (e.g., received, automatically generated, etc.) for each user.

However, any other suitable run specification can be determined.

Determining a set of experiments from the run parameters S200 functions to determine the resources required to run the experiments and to generate the scripts for individual experiments themselves. S200 is preferably performed by the platform, but can alternatively be performed by an agent, a third party (e.g., a cluster orchestrator, a cloud computing system, etc.), a user, and/or by any other suitable system. S200 can be performed: once for each run, iteratively for a run (e.g., wherein new experiment specifications are determined based on the results of prior experiments of the run), and/or otherwise determined. S200 is preferably automatically performed responsive to S100, but can additionally or alternatively be performed after telemetry is received from the cluster(s), upon satisfaction of a predetermined set of conditions, and/or at any other suitable time.

Each experiment specification can be associated with one or more experiments of the run, and can specify how the respective experiment is run. The experiment specifications are preferably unique within the run, but can alternatively be nonunique. Each experiment specification preferably includes a different combination (e.g., permutation) of parameter value options specified in the run specification (e.g., examples shown in FIG. 11 and FIG. 12), but can additionally or alternatively include default experiment parameter values and/or other values.

In a first variation, S200 includes receiving the experiment specification from the user.

In a second variation, S200 can include automatically determining the experiment specifications. The experiment specifications are preferably determined based on the experiment parameter values (and optionally the sampling or search strategies) from the run specification, but can additionally or alternatively be determined based on prior experiment results (e.g., telemetry, metrics, etc.) and/or other information.

This second variation can include: determining value options for each experiment parameter; and determining a combination of experiment parameter values to generate an experiment specification.

The value options for each experiment parameter are preferably determined from the run specification, but can additionally or alternatively be determined based on prior experiment results, or be otherwise determined.

In a first embodiment, the value options are directly extracted from the run specification (e.g., when discrete values are provided for a given experiment parameter).

In a second embodiment, the value options are determined based on a range and sampling or combination scheme specified in the run specification. For example, when the experiment parameter values are continuous variables (e.g., a range), values can be pre-sampled for the experiment parameter using the specified sampling method before experiment specification determination. In an illustrative example, when the run specification specifies that the values for an experiment parameter be determined using "uniform (1e-5, 1e-2, 4)", four values can be uniformly sampled from a range between 1e-5 and 1e-2, and be used as the experiment parameter's value options.

In a third embodiment, the value options are determined based on prior experiment results. For example, experiment specifications sharing one or more experiment parameter values with failed experiments can be removed or adjusted (e.g., to exclude problematic experiment parameter values). In another example, one or more experiment parameter values associated with (e.g., resulting in) good experiment results can be used in subsequent experiment specifications. Good experiment results can include: successful experiments, fast experiments (e.g., faster than other experiments, within the fastest N % of experiments, less than a threshold run time, etc.), low-cost experiments (e.g., lower than other experiments, within the lowest M % of experiments, less than a threshold cost, etc.), experiments resulting in high-performant models (e.g., high accuracy, high precision, high F-score, etc.), and/or be otherwise defined. In another example, experiment parameter values for subsequent experiments can be determined based on an optimization (e.g., constraint satisfaction, cross-entropy, gradient descent, grid search, local search, nearest neighbor search, simulated annealing, etc.), given prior experiment results and/or a set of target experiment metrics or run metrics. Additionally or alternatively, the experiment results (e.g., telemetry, metric) can be otherwise used to adjust the search strategy (e.g., to prioritize higher-performing experiment parameter values and/or deprioritize lower-performing experiment parameter values), adjust the search space (e.g., by removing or adding values to the option set), and/or be otherwise used to determine which experiment parameter values to include in a subsequent experiment specification.

In a fourth embodiment, the value options are optimized based on an optimization target. The value options can be optimized on a per-run basis (e.g., experiment population basis), per-experiment basis, per-parameter basis, and/or on any other suitable basis. Examples of optimization targets can include: cost (e.g., less than a threshold cost), runtime, completion time, other run metrics, and/or any other suitable target. This can include: iteratively calculating the target value and adjusting the experiment parameter values until the target is satisfied (e.g., for each experiment, across the experiment set, etc.); calculating the experiment parameter values based on an optimization; and/or otherwise determining the experiment parameter values such that the optimization target is met.

However, the value options can be default values, be determined using a mapping or text expander, or be otherwise determined.

The combination of experiment parameter values can be determined according to a standard sampling strategy, a selection parameters specified in the run specification, and/or otherwise sampled.

In a first embodiment, the experiment specifications (e.g., experiment parameter value combinations) are determined as every possible combination of the experiment parameter values within the run specification.

In a second embodiment, the experiment specifications (e.g., experiment parameter value combinations) are determined using the selection parameters specified in the run specification. For example, the run specification can specify that the experiment specifications be selected using a grid search, wherein a different experiment specification is generated from every possible combination of the experiment parameter values within the run specification. In an illustrative example, a run specification specifying learning rates of [1e-3, 1e-4] and layer numbers [2, 4] can generate four experiment specifications: [lr: 1e-3, layers: 2], [lr: 1e-3, layers: 4], [lr: 1e-4, layers: 2], [lr: 1e-4, layers: 4]. In another example, the run specification can specify that a predetermined number of experiment specifications be randomly determined from the run specification's experiment parameter values. In an illustrative example, a run specification specifying that two experiments be generated from a set of experiment parameter values including learning rates of [1e-3, 1e-4] and layer numbers [2, 4] can generate two experiment specifications: [lr: 1e-3, layers: 2] and [lr: 1e-4, layers: 4], wherein the values for each parameter in each experiment specification is randomly selected from the respective value options.

However, the experiment specifications can be otherwise determined.

The method can optionally include estimating the run metrics for the run. The run metrics can be estimated: before the run is executed, during run execution (e.g., iteratively), and/or at any other suitable time. The run metrics can be estimated by: the platform, the agent, the cluster orchestrator, the machine provider, and/or by any other suitable system or entity. The run metrics can be estimated based on information extracted from the run specification, machine provider data (e.g., cost data, availability, latency, processing speed, etc.), prior run metrics (e.g., historical run metrics, such as history for the machine type, history for the cluster type, history for the machine provider, history for the cluster orchestrator, etc.), experiment metrics (e.g., from the same cluster, similar clusters, the same run, etc.), the type of cloud computing instance used (e.g., spot instance, on demand instance, reserved instance, etc.), and/or other data.

Run metrics can include: cost, runtime, failure percentage, success percentage, and/or any other suitable metric. Runtime can be calculated based on the size of the dataset, the model complexity, the types of machines specified by the run parameters, the number of machines needed, the type of cloud computing instance used, the amount of memory specified by the run parameters, the machine's processing speed, the runtime for a single experiment executing on a local session, and/or other factors. For example, the run's estimated runtime can be determined as a function of the number of experiments within the run and the estimated time to run each experiment. The estimated time to run each experiment can be estimated based on the model complexity, the size of the dataset, and/or otherwise determined. The cost can be calculated based on: experiment runtime (e.g., individually or collectively), whether the user wants to run the experiments concurrently, the percentage of experiments the user wants to succeed, the run execution's time of day, how quickly the user wants the results, which machine provider is used, the cloud computing system's pricing (e.g., for storage, machine usage, etc.), the type of cloud computing instance used, and/or other factors. The run metrics can be calculated (e.g., using an equation), estimated (e.g., using a model, trained on historic data), looked up, and/or otherwise determined. For example, the cost for a run can be determined by multiplying the estimated runtime per experiment by the cost for each machine instance for the estimated runtime by the number of machines required per experiment by the number of experiments per run. However, the run metrics can be otherwise determined. The estimated run metrics can optionally be presented to the user for approval.

The method can optionally include determining the number of experiments within the run. This can be determined by the platform, by the agent, by the system determining the experiment specifications, and/or otherwise determined. The number of experiments can be determined as part of determining the experiment specifications, or be separately determined. In a first variation, the number of experiments can be the number of possible combinations of the experiment parameter values within the run specification. In a second variation, the number of experiments can be specified in the run specification. In a third variation, the number of experiments is estimated based on the experiment results (e.g., initial experiment metrics, initial model metrics, etc.). For example, the number of experiments can be estimated based on the number of attempts (e.g., different experiment specifications) needed to converge on a desired model performance value. However, the number of experiments can be otherwise determined.

Determining the computing resources for the run functions to determine the machine parameters required to execute one or more experiments (e.g., for the run, for an experiment, etc.). Examples of machine parameters can include: the number of machines, the type of machines, and/or any other suitable set of machine parameters. This can be used to provide a cost or runtime estimate, used to determine which machines to provision, used to select machine provider to use (e.g., whether a cloud cluster needs to be provisioned, whether the run can be wholly executed on an on-premises system), used to select the cluster orchestrator to use, used to select the agent(s) to use, and/or otherwise used. The machine parameters can be determined by the platform, by the user, by an agent, and/or by any other suitable system or entity. The machine parameters can be determined from the run specification (e.g., the number of experiments, the types of machines per experiment, run metric targets, etc.), the experiment specifications, and/or otherwise determined.

The types of machines can be a default machine type or a machine type specified by the run specification per experiment, or otherwise determined. For example, the run specification can specify that the experiments be executed on GPUs, or a mix of GPUs and CPUs.

The number of machines can be the number of experiments multiplied by the number of machines per experiment. For example, a run specification specifying 5 experiment specifications with 2 GPUs per experiment can require 10 GPUs. Alternatively, the number of machines is estimated (e.g., based on the number of experiments specified by the run specification, the amount of time needed to execute each experiment, etc.). Alternatively, the number of machines can be the number of machines per experiment epoch (e.g., total number of machines required for all experiments divided by the number of experiment epochs). The number of experiment epochs can be determined based on estimated run metric and a target run metric (e.g., a limit or threshold metric value), based on prior experiment metrics or run metrics, or otherwise determined. For example, the number of experiment epochs can be determined based on the total estimated run time divided by the maximum run time (e.g., specified by the run specification, retrieved from the user account, specified by the platform, etc.). However, the number of machines can be otherwise determined.

The machine provider to use can be determined: from the run specification, from user preferences associated with the user account, from the cloud credentials associated with the user account, the cost per machine type or machine provider, and/or otherwise determined. For example, when the user account is associated with (e.g., has access to) on-premises machines, the on-premises machines can be preferentially selected for use, wherein other machine providers (e.g., cloud computing providers) can be used when the on-premises machines have insufficient capacity to execute the experiments within the constraints set by the user. In another example, the machine providers are selected for a run based on the respective cost (e.g., wherein lower-cost providers are preferentially selected). In another example, the machine providers are selected for a run based on the estimated run time (e.g., wherein faster providers are preferentially selected). However, the machine providers can be otherwise selected.

However, the machine parameters can be otherwise determined.

Executing the set of experiments S400 functions to run one or more machine learning experiments on one or more machines. S400 is preferably performed by the platform, but can additionally or alternatively be performed by the agent, the cluster orchestrator, and/or by any other suitable system or entity. The platform preferably indirectly controls the computing resources to execute the experiments (e.g., by sending instructions to the agent), but can alternatively directly control the computing resources. The agent preferably indirectly controls the computing resources to execute the experiments (e.g., by controlling the respective cluster orchestrator to execute the experiments), but can alternatively directly control the computing resources.

The experiments are preferably executed using a set of control instructions, but can be otherwise controlled. The control instructions can be for: a cluster, a node, a datastore, an agent, a cluster orchestrator, a machine provider, a computing environment provider (e.g., a container provider), a machine, a run, an experiment, and/or for any other suitable computing environment (e.g. physical or virtual), orchestration actor, application, and/or set thereof. Examples of control instructions can include instructions to: provision, start, stop, restart, pause, resume, teardown, and/or otherwise operate the computing environment, orchestration actor, application, and/or set thereof. The same set of control instructions are preferably used for all agents (e.g., a standard control instruction protocol, etc.) and/or models, but different control instructions can alternatively be used for different agent and/or model types or instances. Different control instructions are preferably used for different cluster orchestrators, machine providers, and/or machine types but the same control instructions can alternatively be used for different cluster orchestrators, machine providers, and/or machine types.

Figure 16:
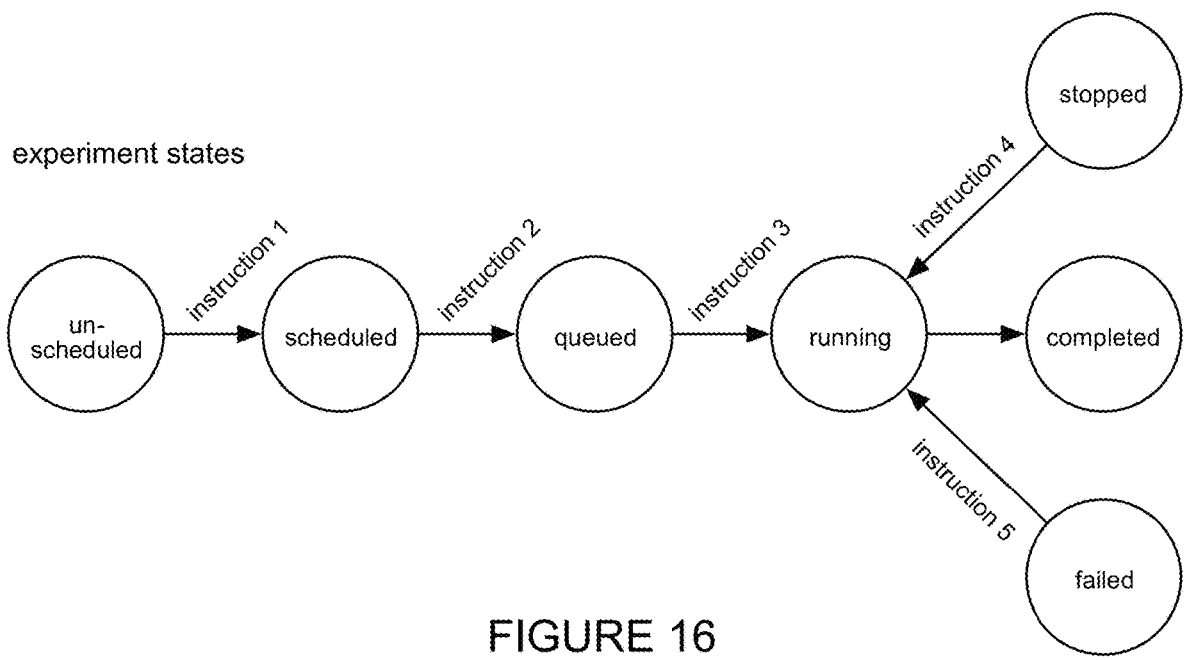
FIG. 16 is a schematic representation of an example state machine of experiment states.
Figure 17:
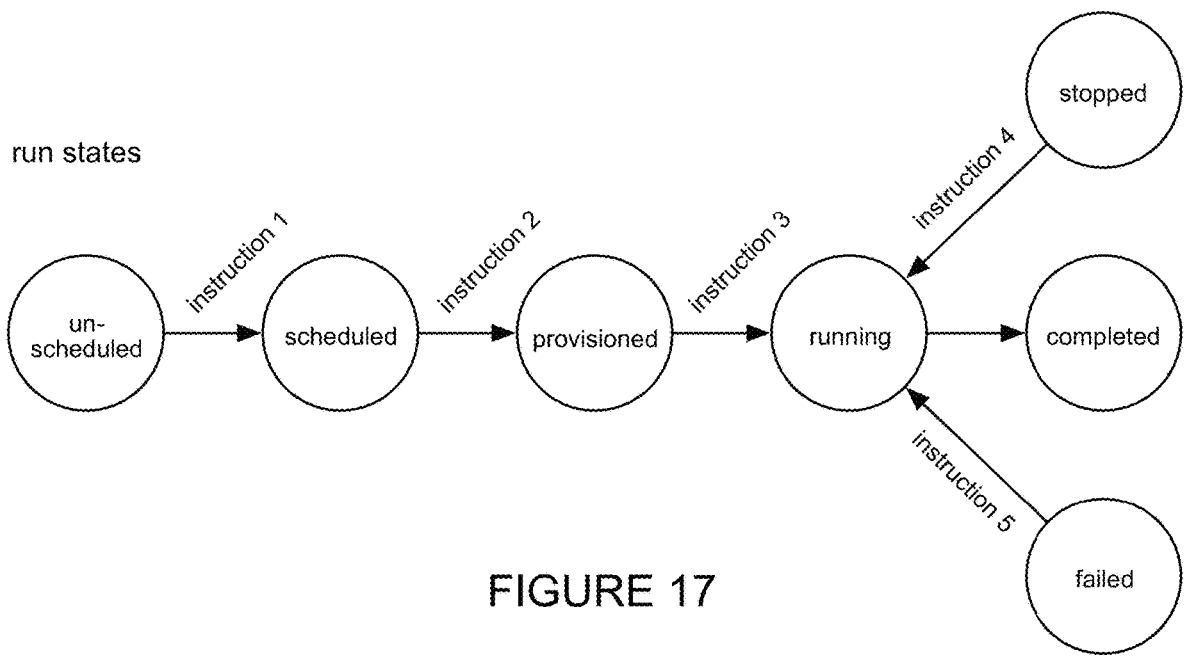
FIG. 17 is a schematic representation of an example state machine of run states.

The control instructions are preferably determined based on a state machine (e.g., state diagram, directed acyclic graph), but can additionally or alternatively be determined based on a set of rules, a lookup table, a decision tree, and/or otherwise determined. The system can include one or more state machines, wherein each state machine can represent a series of states for: an experiment (e.g., example shown in FIG. 16), a run (e.g., example shown in FIG. 17), a container, a container orchestrator, an agent, a node, a cluster, a datastore, an object store, any other suitable application, computing environment, orchestration actor, and/or controlled target. Different systems can use different state machines (e.g., the platform uses a run state machine, while the agent uses an experiment state machine). Each state within the state machine can represent a possible or desired state of the controlled target. Each edge within the state machine can be associated with a different set of control instructions to transition the controlled target to the subsequent connected state, but can be associated with any other suitable information. The states can represent: current states of the controlled target (e.g., wherein the tracked state can be reconciled with the actual state of the controlled target), expected states of the controlled target (e.g., wherein the control instructions transition the controlled target from an actual state to the expected state), control instruction sets to execute, and/or other states of the controlled target.

Executing the set of experiments can include: provisioning a machine set S500; and iteratively: scheduling experiments to machines within the machine set S600 and running the experiments S700.

Provisioning a machine set S500 functions to prepare the computing environment within the cloud computing system for experiment execution. S500 is preferably performed after S200, more preferably after the user approval of the run metrics but alternatively at any other time. The machine set (e.g., cluster) preferably includes the types of machines associated with the run (e.g., specified by the run specification, specified by the experiment specification, etc.), but can alternatively include a subset of the machine types. The machine set preferably includes the number of machines associated with the run (e.g., total number of machines for concurrent execution, number of machines per experiment epoch, etc.), but can alternatively include a subset of the number of machines. However, the machine set can be otherwise constructed.

S500 can include: optionally accessing the user's cloud account using the user's access credentials; optionally initializing a cluster orchestrator instance (e.g., to initialize a cluster); provisioning the machine set (e.g., by loading and running a set of container images on each machine); provisioning a dataset storage volume; provisioning an object storage volume; loading agents onto the cluster (e.g., wherein the agents can be specific to the cluster orchestrator and/or machine provider; wherein the agents can be included within the container image, etc.); loading the model onto each machine; and/or otherwise provisioning the machine set. The provisioned environment preferably includes a single dataset volume, but can alternatively include multiple (e.g., one for each cluster, one for each machine, one for training data and one for test data, etc.).

Provisioning the dataset volume can include: copying data to the dataset volume from the dataset source identified by the dataset source identifier; mounting the dataset volume specified by the dataset source identifier; or otherwise provisioning the dataset volume. S500 can optionally include providing machine access to the dataset within the dataset volume. This can include: taking a snapshot of the dataset within the dataset volume and mounting the snapshot to each machine (e.g., example shown in FIG. 3); copying the dataset to each machine; setting up each machine to read directly from the dataset volume; and/or otherwise providing machine access to the dataset. S500 can optionally include splitting the dataset into training data and test data (e.g., automatically), wherein the training data can be provided to the machine/model during a training phase, and test data can be provided to the machine/model during a testing or validation phase.

Loading the model onto each machine can include: copying the model to the machine from the model source identified by the model source identifier; cloning a machine already set up with the model; and/or otherwise loading the model onto each machine. Loading the model can optionally include validating the (library) dependencies referenced by the model and installing replacement or new dependencies for invalid dependencies. The dependencies can be validated: by extracting the dependencies from the model and comparing the dependencies against a lookup table (e.g., for known machine-incompatible dependencies, for updated library versions, etc.); by running the model and evaluating the errors; and/or otherwise validated. The replacement dependencies can be determined using a lookup table or otherwise determined.

Scheduling experiments to machines within the machine set S600 functions to assign one or more experiments to each machine. The machines can be those provisioned in S500, be existing machines (e.g., existing clusters), and/or be any other suitable set of machines. S600 can optionally include assigning a time (e.g., start time, stop time) to each experiment. S600 is preferably performed by the platform (e.g., wherein the platform stores the assignments and/or schedule), but can be performed by the agent, by the cluster orchestrator, and/or by another system. S600 is preferably automatically performed (e.g., after run request receipt), but can alternatively be manually performed or otherwise performed. The experiment-machine pairing can be assigned based on the run parameters, randomly, a rule, run telemetry, or otherwise assigned. The experiment time can be determined using an optimization (e.g., to minimize cost, minimize run runtime, etc.), a ruleset, based on the estimated stop time of a prior experiment assigned to the shared machine, and/or otherwise determined.

S600 preferably includes: scheduling runs to clusters S610; and scheduling experiments to machines S630 (e.g., example shown in FIG. 5), but can be otherwise performed.

Scheduling runs to clusters S610 functions to assign a set of experiments to one or more clusters for execution. The runs are preferably scheduled by the platform, but can alternatively be scheduled by the user or another system or entity. Each run is preferably scheduled to a single cluster (and/or the respective agent), but can alternatively be scheduled to multiple clusters (e.g., when the run size exceeds a maximum cluster size, when a cluster does not include the machine types specified by the experiment specifications, when spot instances are used, etc.). In the latter variant, each of the multiple clusters can be dedicated solely to the run, or execute experiments from other runs (e.g., concurrently, interleaved, sequentially, etc.).

The run can be scheduled based on: a shared user account (e.g., the run from a user can be scheduled to a cluster for the account), machine compatibility (e.g., wherein the cluster includes at least the number and type of machines specified for the run and/or constituent experiments or a subset thereof), estimated machine reliability, run priority (e.g., determined by the user, determined by the platform, etc.), an optimization of the run metrics, user preferences, prior telemetry (e.g., from prior related runs, from prior experiments from the run), and/or otherwise determined. For example, a run can be scheduled to a cluster that the user controls. In a second example, a run can be scheduled to a slower, but cheaper cluster when the user is optimizing for cost. In a third example, a run can be scheduled to an expensive but fast cluster when the user is optimizing for speed. In a fourth example, a run can be scheduled based on the telemetry from a prior run sharing similar parameters (e.g., similar model types, dataset sizes, etc.). For example, the run can be scheduled to the same cluster or a similar cluster when the prior run telemetry satisfies a set of conditions (e.g., satisfies the user's run metric constraints), and scheduled to a different cluster when the prior run telemetry does not satisfy the conditions. In a fifth example, a run can be scheduled based on the telemetry from experiments of the run. For example, the remainder of the run can be scheduled to a new cluster when a threshold proportion of the experiments fail (e.g., all experiments fail; a majority of the first Y experiments fail; etc.). However, the runs can be otherwise scheduled.

Scheduling experiments to machines S630 functions to assign individual experiments to machines, such that the experiments within a run can be concurrently and/or sequentially run. Each experiment is preferably scheduled to a single node, but can alternatively be scheduled to multiple nodes. Each node preferably includes the number of machines (e.g., processing units) per experiment (e.g., as specified in the run specification and/or experiment specification), but can alternatively include a single machine. Each experiment is preferably scheduled to a node within the cluster that the respective run was scheduled to, but can alternatively be scheduled to another cluster. The experiments are preferably scheduled by the cluster orchestrator controlling the cluster, but can alternatively be scheduled by the agent for the cluster, the platform, and/or by any other suitable system or entity. For example, the platform can schedule the run to a cluster, and send the experiments within the run to the agent of the cluster. The agent can then send the experiments to the cluster orchestrator of the cluster for scheduling. However, the experiments can be otherwise scheduled.

The experiments can be scheduled: based on cluster orchestrator rules, using a job scheduling method (e.g., of the cluster orchestrator), randomly, based on experiment results (e.g., telemetry, metrics) of another experiment, node load (e.g., current, scheduled, and/or estimated), and/or otherwise scheduled. For example, a subsequent experiment can be scheduled to a node when the prior experiment executing on the node was highly performant (e.g., did not fail, was successful, ran quickly, incurred less than a threshold cost, etc.), and be scheduled to a different node when the prior experiment was not performant. However, the experiments can be otherwise scheduled.

When the run includes distributed experiments, the distributed experiments are preferably scheduled to the same cluster (e.g., to one or more nodes within the same cluster), but can alternatively be scheduled to different clusters.

However, the experiments can be otherwise scheduled.

Running the experiments S700 functions to execute the experiments determined in S200. S700 is preferably controlled by the cluster orchestrator and executed by the respective machine, but can be controlled by the agent, by the platform, and/or otherwise performed. The experiments can be run: serially, concurrently, contemporaneously, according to a schedule (e.g., determined in S600), or in any other suitable order. S700 preferably includes training each experiment's instance of the model using the dataset (e.g., from the mounted snapshot); iteratively updating the experiment state in the shared object storage volume while the model is being trained; and storing the experiment outputs (e.g., model parameters, model artifacts, logs, etc.) in the object storage volume.

S700 can optionally include validating the trained model (e.g., using a test dataset from a mounted snapshot); and storing the validation outputs (e.g., confusion matrix, accuracy, positive or negative predictive value, precision, sensitivity, recall, specificity, F1 score, gain and lift, Kolomogorov Smirnov chart, AUC-ROC, log loss, gini coefficient, concordant-discordant ratio, RMSE, RMSLE, R-squared, cross-validation, etc.) in the object storage volume. S700 can optionally include selecting a model that satisfies user model targets (e.g., accuracy or precision targets) based on the validation outputs.

S700 can optionally include facilitating intra-experiment communication for distributed experiments. In a first variant, intra-experiment communication for distributed experiments can be facilitated by the agent or the cluster orchestrator. This variant can be particularly useful when all experiments in the distributed experiment are within the same cluster. In this variant, the agent or cluster orchestrator can access and transfer data between nodes. Alternatively, the data is stored to a shared object store, wherein the agent or cluster orchestrator can instruct the nodes within the distributed experiment to read relevant data from the object store at the correct time. In a second variant, intra-experiment communication for distributed experiments can be facilitated by the platform. In this variant, the intra-experiment data can be extracted by the agent (e.g., from the experiment node, from the datastore) and sent to the platform, wherein the platform forwards the intra-experiment data to an agent for another cluster hosting another portion of the experiment. However, intra-experiment communication can be otherwise performed.

S700 can optionally include monitoring the run, which can monitor summary metrics for all experiments, summary metrics for a set of experiments, metrics for a single experiment, and/or any other suitable data. The run is preferably monitored by the agent within the run environment, but can alternatively be monitored by the platform, and/or by any other suitable system. The run can be monitored based on telemetry (e.g., run telemetry, experiment telemetry, cluster telemetry, node telemetry, etc.), which can be obtained by: reading the telemetry from the object storage volume, requesting the telemetry from the agent, requesting the telemetry from the cluster orchestrator, or otherwise obtained. Telemetry can include: machine health (e.g., processing resources consumed, etc.), machine set state (e.g., experiment state, machine state, cluster state, etc.), filepaths generated by the experiments, artifacts, experiment success/fail, run metrics (e.g., current cost, current runtime), and/or any other suitable telemetry variable.

The telemetry can be: read, generated, or otherwise determined. The telemetry can be signed or encrypted with an asymmetric keypair or symmetric key shared between the platform and the agent. In a first variation, the agent accesses the experiment data within the node or the object store, generates summary data, and sends the summary data to the platform for analysis. In a second variation, the agent forwards a restricted set of data (e.g., states and model metrics only) to the platform for analysis. However, the telemetry can be otherwise determined.

Monitoring the run can be used to determine whether a run or an experiment should be halted (e.g., due to an error, when a run metric is estimated to exceeds or already exceeds a user-specified threshold) or retried (e.g., when the experiment ended but was not complete), determine whether new resources (e.g., machines, storage, etc.) are needed, determine which control instructions should be sent to the agent, or otherwise used. For example, a cluster metric (e.g., indicative of health, resource consumption, etc.) can be calculated based on cluster telemetry, wherein machines can be added to or removed from the machine set based on the cluster metric. When machines are added, the new machines can be provisioned and executed as discussed in S500 and S600, respectively, or otherwise managed. The experiments assigned to the new machine can additionally be stored in association with the machine identifier and/or user account by the platform.

In a first variation of S700, the platform schedules a run to a cluster, wherein the agent for the cluster receives the run (e.g., the set of experiment specifications) and the control instructions. The agent then converts the control instructions to cluster orchestrator-specific instructions, and instructs the cluster orchestrator to execute the run using the cluster orchestrator-specific instructions. The cluster orchestrator then schedules the experiments to individual nodes (or sets thereof), and controls individual experiment execution. The agent can monitor experiment execution, and dynamically instruct the cluster orchestrator to progress each experiment to the next state (e.g., based on an agent state machine; independent of the platform). The agent can generate telemetry based on the: experiment telemetries, cluster orchestrator telemetry, model metrics, and/or any other suitable data. The agent can send the telemetry to the platform, wherein the platform can monitor the run state based on the telemetry from each cluster (e.g., compare telemetries from different clusters associated with the same run, etc.). The platform can optionally generate control instructions for a run based on the telemetry (e.g., to progress the run to a desired state), which can be sent to the respective agent, wherein the method can be repeated with the new control instructions.

In a second variation, S700 is similar to the first variation, but the platform can interact directly with the cluster orchestrator (e.g., wherein the agent is executing in the platform environment).

However, S700 can be otherwise performed.

The method can optionally include reconciling the machine set S800, which can function to reconcile the run state stored by the platform with the run state evidenced by the machines. This can function to restore the platform's ability to monitor and manage the machine set after cloud computing system disconnection or outage. In a first variant, S800 includes reading the run state from the machines (e.g., from the object storage volume), identifying discrepancies in between the read run state and the stored run state, and controlling deviant machines (e.g., by adjusting experiment parameters, making cloud computing system calls, etc.) such that the machine states match the stored run states. In a second variant, S800 includes reading the run state from the machines (e.g., from the object storage volume) and updating the run state stored by the platform. However, S800 can be otherwise performed.

Figure 18:
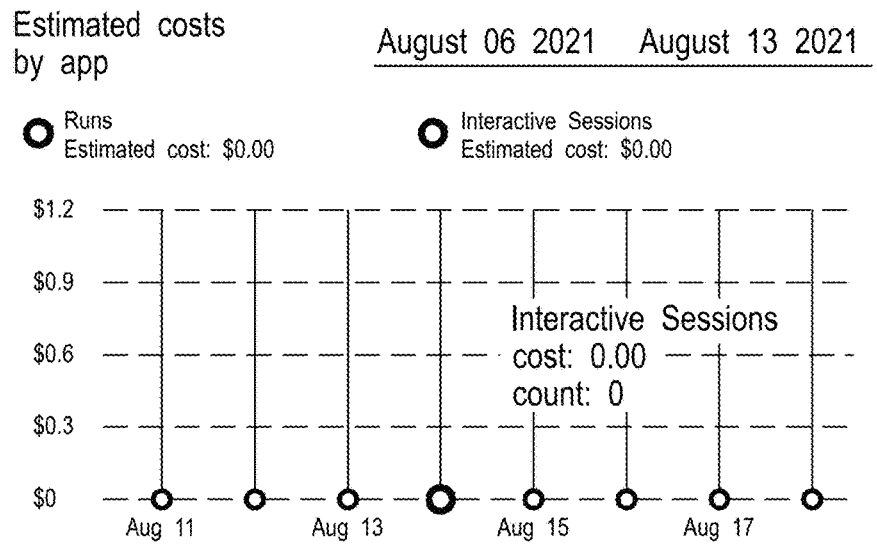
Figure 19:
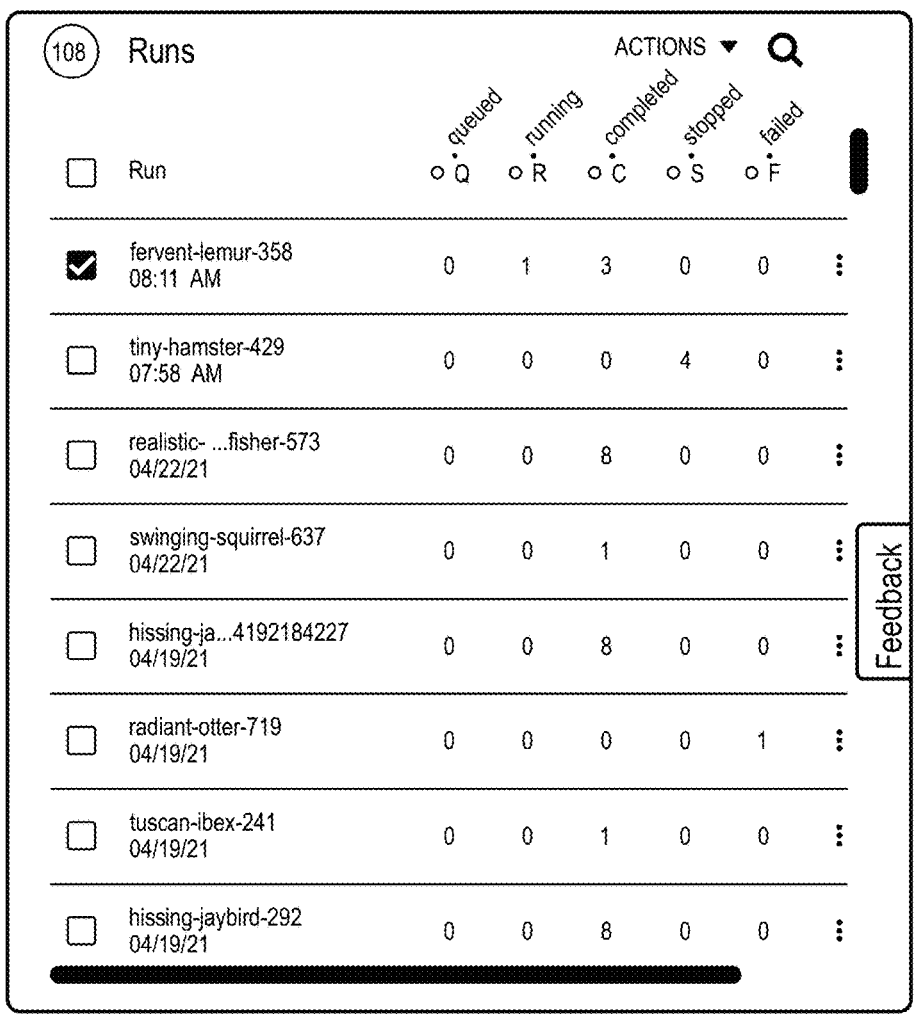
Figure 22:
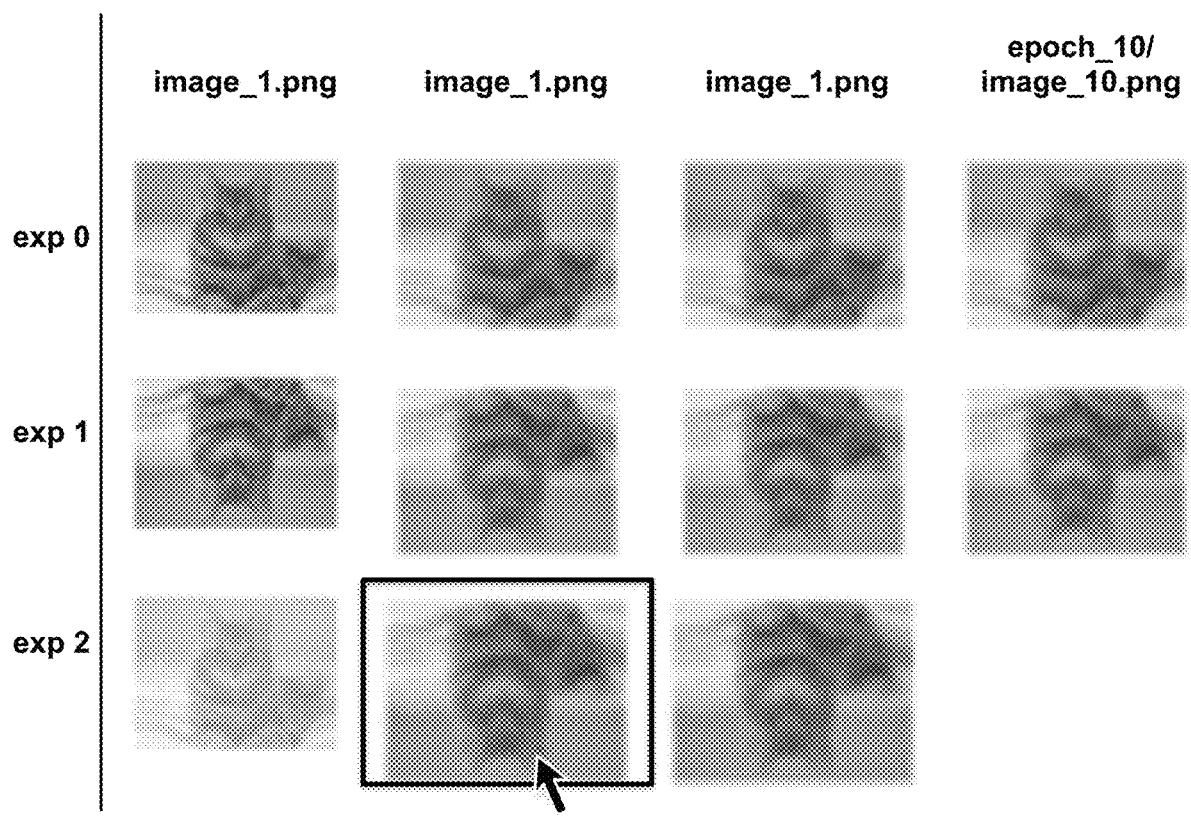

The method can optionally include visualizing the experiment results. The logs, artifacts, run metrics, run metadata, experiment states, experiment parameters (e.g., hyperparameter values), and/or any other suitable information can be visualized. For example, artifacts from multiple experiments of the same run can be visualized side by side in a chart or graph for ease of comparison (e.g., examples shown in FIG. 22 and FIG. 23). In another example, experiment metrics and/or run metrics can be visualized as a graph over time (e.g., example shown in FIG. 18). In another example, a summary of all experiments within a run can be visualized as a chart (e.g., example shown in FIG. 20). In another example, a summary of all runs for a user can be visualized as a chart (e.g., example shown in FIG. 19). In another example, a summary of all sessions can be visualized as a chart (e.g., example shown in FIG. 21). However, other data can be otherwise visualized. The visualized data can be: data accessible by the platform (e.g., via an agent, stored by the platform, etc.), data accessible only through the machine provider (e.g., wherein the user logs into the cloud computing system to access the data for visualization; wherein the user accesses the data through a presigned URL to the file that is generated by the agent on behalf of the user using user credentials, such that the raw data is not transmitted through the platform or is merely proxied through the platform), data accessible through a notebook or session, and/or other data.

The method can optionally include cancelling one or more experiments. This can be performed manually, automatically (e.g., when a cancel condition is met), and/or at otherwise performed. Cancelling an experiment can include: instructing the respective machine to cancel the experiment, storing the experiment data to the object storage volume, and shutting down the respective machine. However, the experiments can be otherwise cancelled.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules (e.g., using code) in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system, comprising:
a plurality of agents, each installed on a different computing cluster, wherein each computing cluster is controlled by a different cluster orchestrator; and
a processing system, configured to:
receive cluster telemetry, comprising metrics for experiments running on a cluster, from the agent for the respective cluster; and
send control instructions determined based on the cluster telemetry to the agent, wherein the agent controls the respective cluster orchestrator according to the control instructions, wherein the control instructions are in a platform-standard protocol, wherein the agent controls the respective cluster orchestrator using a cluster orchestrator-specific protocol.

2. The system of claim 1, wherein the processing system facilitates storage of artifacts generated by the experiments within an object store connected to the respective cluster, wherein the processing system cannot directly access the artifacts.

3. The system of claim 1, wherein the experiments running on a cluster are part of a shared run, wherein the processing system determines the experiments for each run and schedules runs to clusters, wherein different experiments are scheduled to different sets of nodes within the cluster.

4. The system of claim 3, wherein the cluster orchestrator of the respective cluster schedules the experiment to the different sets of nodes within the cluster.

5. The system of claim 3, wherein all experiments of the shared run are specified by a single-line run request comprising: a set of model identifiers, a set of datastore identifiers, and a set of hyperparameter values, wherein the experiments are automatically scheduled responsive to receipt of the single line run request without human intervention.

6. The system of claim 1, further comprising an experiment reconciler, configured to reconcile experiments across different clusters.

7. A system for multi-cluster machine learning experiment orchestration, comprising:
a plurality of agents, each installed on a different computing cluster, wherein each agent is configured to control a cluster orchestrator of the computing cluster, and wherein each cluster orchestrator controls a plurality of nodes within the respective computing cluster; and
a processing system, comprising a multitenant platform, configured to:
determine a set of runs, each run comprising a set of machine learning experiments; and
schedule runs to clusters, wherein the agent associated with the cluster controls run execution on the cluster;
wherein the processing system concurrently controls execution of different sets of runs on different sets of clusters for different users.

8. The system of claim 7, wherein a run is executed on a heterogeneous computing architecture.

9. The system of claim 7, wherein the runs are scheduled to clusters based on an optimization over an estimated execution time and estimated execution cost for all experiments within the run to execute on the respective cluster.

10. The system of claim 7, wherein each run is associated with a run specification comprising a set of model identifiers, a set of dataset identifiers, and a set of hyperparameter values, wherein each experiment within the run is associated with an experiment configuration comprising at least one model identifier from the set of model identifiers, at least one dataset identifier from the set of dataset identifiers, and a combination of hyperparameter values.

11. The system of claim 10, wherein the processing system determines a set of experiment configurations associated with a run and sends the experiment configurations to the agent associated with the cluster scheduled for the run.

12. The system of claim 10, wherein each experiment is assigned to a set of nodes within the cluster by the cluster orchestrator.

13. The system of claim 10, wherein the experiment configuration is further determined based on run telemetry from a previously-executed run.

14. The system of claim 7, wherein the processing system is configured to initialize a set of clusters, determine the set of runs, schedule the runs, and dynamically manage the runs without user intervention, responsive to receipt of a single line request comprising a run specification.

15. The system of claim 7, wherein the processing system initializes a cluster on behalf of a user using authorization credentials provided to the processing system by the user.

16. The system of claim 7, wherein the agent sends run telemetry to the processing system, wherein the processing system schedules another run of the set to another agent based on the run telemetry.

17. The system of claim 7, wherein each experiment generates a trained machine learning model associated with model metrics, wherein the processing system accesses the model metrics via the agent and cannot access the trained machine learning model.

18. The system of claim 7, wherein the cluster orchestrator comprises a Kubernetes™ deployment.

19. A system, comprising:
a plurality of agents, each installed on a different computing cluster, wherein each computing cluster is controlled by a different cluster orchestrator; and a processing system, configured to:
  receive cluster telemetry, comprising metrics for experiments running on a cluster, from the agent for the respective cluster, wherein the experiments running on the cluster are part of a shared run, wherein the processing system determines the experiments for each run and schedules runs to clusters, wherein different experiments are scheduled to different sets of nodes within the cluster; and
  send control instructions determined based on the cluster telemetry to the agent, wherein the agent controls the respective cluster orchestrator according to the control instructions.

20. A system, comprising:
a plurality of agents, each installed on a different computing cluster, wherein each computing cluster is controlled by a different cluster orchestrator;
a processing system, configured to:
  receive cluster telemetry, comprising metrics for experiments running on a cluster, from the agent for the respective cluster;
  send control instructions determined based on the cluster telemetry to the agent, wherein the agent controls the respective cluster orchestrator according to the control instructions; and
  reconcile experiments across different clusters.

* * * * *